(12) United States Patent
Liu et al.

(10) Patent No.: US 11,218,991 B2
(45) Date of Patent: Jan. 4, 2022

(54) BROADCAST SIGNAL SENDING METHOD, BROADCAST SIGNAL RECEIVING METHOD, NETWORK DEVICE, AND TERMINAL DEVICE

(71) Applicant: Huawei Technologies Co., Ltd., Shenzhen (CN)

(72) Inventors: Jin Liu, Shenzhen (CN); Yiqun Ge, Ottawa (CA); Pu Yuan, Shanghai (CN); Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 16/673,735

(22) Filed: Nov. 4, 2019

(65) Prior Publication Data

US 2020/0163054 A1 May 21, 2020

Related U.S. Application Data

(63) Continuation of application No. PCT/CN2018/085186, filed on Apr. 28, 2018.

(30) Foreign Application Priority Data

May 5, 2017 (CN) .......................... 201710313613.4

(51) Int. Cl.
*H04W 72/00* (2009.01)
*H04L 1/16* (2006.01)
(Continued)

(52) U.S. Cl.
CPC ......... *H04W 72/005* (2013.01); *H04L 1/1642* (2013.01); *H04L 27/2628* (2013.01);
(Continued)

(58) Field of Classification Search
CPC ............. H04W 72/005; H04W 56/001; H04W 72/0446; H04W 72/0453; H04W 72/0466;
(Continued)

(56) References Cited

U.S. PATENT DOCUMENTS

2014/0242995 A1 8/2014 Lee et al.
2016/0007260 A1* 1/2016 Abraham ............ H04W 36/245
370/331
(Continued)

FOREIGN PATENT DOCUMENTS

CN 103875286 A 6/2014
CN 104581840 A 4/2015
(Continued)

OTHER PUBLICATIONS

Machine Translation of Foreign Application KR 10-2017-0056947 (Year: 2017).*

(Continued)

*Primary Examiner* — Afshawn M Towfighi
(74) *Attorney, Agent, or Firm* — Slater Matsil, LLP

(57) ABSTRACT

A broadcast signalling method performed by a network device having a protocol stack of with first and second protocol layers where the second protocol layer is below the first protocol layer, the method including generating, by the network device, first information at the first protocol layer, generating, by the network device, second information at the second protocol layer, where the second information is used to determine a time-frequency resource corresponding to one or more synchronization signal blocks (SSBs), processing, by the network device, the first information and the second information at the second protocol layer, and sending, by the network device to a terminal device by using a physical broadcast channel (PBCH) in the one or more SSBs, data obtained after second protocol layer processing.

20 Claims, 20 Drawing Sheets

(51) Int. Cl.
*H04L 27/26* (2006.01)
*H04W 56/00* (2009.01)
*H04W 72/04* (2009.01)

(52) U.S. Cl.
CPC ..... *H04W 56/001* (2013.01); *H04W 72/0446* (2013.01); *H04W 72/0453* (2013.01); *H04W 72/0466* (2013.01)

(58) Field of Classification Search
CPC . H04L 1/1642; H04L 27/2628; H04L 5/0091; H04L 5/0053; H04L 29/08; H04L 69/30; H04L 16/14; H04L 1/1607
See application file for complete search history.

(56) References Cited

U.S. PATENT DOCUMENTS

| | | | |
|---|---|---|---|
| 2016/0021551 A1 | 1/2016 | Park et al. | |
| 2017/0135029 A1* | 5/2017 | Chendamarai Kannan | ............... H04W 72/04 |
| 2018/0124689 A1* | 5/2018 | Frenger | ............... H04W 48/12 |
| 2018/0324732 A1* | 11/2018 | Park | ............... H04W 72/12 |
| 2019/0081827 A1* | 3/2019 | Ly | ............... H04L 25/03866 |
| 2019/0110275 A1* | 4/2019 | Hapsari | ............... H04W 88/08 |

FOREIGN PATENT DOCUMENTS

| | | |
|---|---|---|
| CN | 105075322 A | 11/2015 |
| CN | 105900503 A | 8/2016 |
| EP | 3618506 A4 | 9/2020 |
| JP | 2020511053 A | 4/2020 |
| JP | 2020515196 A | 5/2020 |
| JP | 2020519119 A | 6/2020 |
| KR | 20150122790 A | 11/2015 |
| WO | 2018204517 A1 | 11/2001 |
| WO | 2018156301 A1 | 8/2018 |
| WO | 2018174796 A1 | 9/2018 |
| WO | 2018198343 A1 | 11/2018 |

OTHER PUBLICATIONS

"Discussion on SS Time Index Indication," Agenda item: 8.1.1.1.2, Source: Sequans Communications, Document for: Discussion, 3GPP TSG-RAN WG1 #88 bis, R1-1704599, Spokane, USA Apr. 3-7, 2017, 10 pages.

"Discussion and Evaluation on NR-PBCH Design," Source: NTT Docomo, Inc., Agenda Item: 8.1.1.2.1, Document for: Discussion and Decision, 3GPP TSG RAN WG1 Meeting #88bis, R1-1705708, Spokane, USA, Apr. 3-7, 2017, 7 pages.

"Considerations on PBCH in NR," Agenda item: 10.4.1.4, Source: Qualcomm Incorporated, WID/SID: NR_newRAT-Core—Release 15, Document for: Discussion and Decision, 3GPP TSG-RAN WG2 Meeting #97bis, R2-1703568, Spokane, USA, Apr. 3-7, 2017, 2 pages.

3rd Generation Partnership Project; Technical Specification Group Radio Access Network; NR; Radio Resouice Control (RRC); Protocol specification (Release 15), 3GPP TS 38.331 V0.0.2 (Mar. 2017), Mar. 2017, 13 pages.

"LS on NR Initial Access," Release 15, Study Item: NR_newRAT-Core, Source: RAN WG1, To: RAN WG 2, RAN WG4 , 3GPP TSG RAN WG2#97bis, R2-1703926, Spokane, USA, Apr. 3-7, 2017, 2 pages.

"3rd Generation Partnership Project: Technical Specification Group Radio Access Network; Study on New Radio (NR) Access Technology (Release 14)," 3GPP TR 38.912 V14.0.0, Jul. 2017, 75 pages.

"SS Burst Composition and Time Index Indication Considerations," Agenda Item: 8.1.1.1.2, Source: Qualcomm Incoporated, Document for: Discussion/Decision, 3GPP TSG-RAN WG1 NR #88, R1-1702585, Feb. 13-17, 2017, 7 pages.

"Discussion on SS Burst Set Composition and SS Block Time Index Indication," Agenda Item: 8.1.1.1.2, Source: Huawei, HiSilicon, Document for: Discussion and Decision, 3GPP TSG RAN WG1 Meeting #88, R1-1703353, Feb. 13-17, 2017, 8 pages.

"SS Block, Burst-Set Composition, and Time Index Indication," Agenda Item: 8.1.1.1.2, Source: Qualcomm Incorporated, Document for: Discussion/Decision, 3GPP TSG-RAN WG1 NR #88bis, R1-1705565, Apr. 3-7, 2017, 10 pages.

"SS Burst Set Composition and SS Time Index Indication," Agenda Item: 8.1.1.1.2, Source: Ericsson, Document for: Discussion, Decision, 3GPP TSG-RAN WG1 Meeting #88, R1-1702120, Feb. 13-17, 2017, 4 pages.

"PBCH Design Considerations," Agenda Item: 8.1.1.2.1, Source: Qualcomm Incorporated, Document for: Discussion and Decision, 3GPP TSG-RAN WG1 #88, R1-1702589, Feb. 13-17, 2017, 10 pages.

"PBCH Design Considerations," Agenda item: 8.1.1.2.1, Source: Qualcomm Incorporated, Document for: Discussion/Decision, 3GPP TSG-RAN WG1 #88, R1-1702589, Feb. 13-17, 2017, 9 pages.

"On NR PBCH Design," Agenda Item: 8.1.1.2.1, Source: ITL, Document for: Discussion and decision, 3GPP TSG RAN WG1 Meeting #88bis, R1-1705793, Apr. 3-7, 2017, 8 pages.

* cited by examiner

BROADCAST SIGNAL SENDING METHOD, BROADCAST SIGNAL RECEIVING METHOD, NETWORK DEVICE, AND TERMINAL DEVICE

CROSS-REFERENCE TO RELATED APPLICATIONS

This application is a continuation of International Application No. PCT/CN2018/085186, filed on Apr. 28, 2018, which claims priority to Chinese Patent Application No. 201710313613.4, filed on May 5, 2017. The disclosures of the aforementioned applications are hereby incorporated by reference in their entireties.

TECHNICAL FIELD

This application relates to the field of communications technologies, and in particular, to a broadcast signal sending method, a broadcast signal receiving method, a network device, and a terminal device.

BACKGROUND

In a long term evolution (LTE) network, to support cell search, two downlink synchronization signals are defined: a primary synchronization signal (PSS) and a secondary synchronization signal (SSS). After user equipment (UE) completes a cell search process, the UE has achieved downlink synchronization with a cell. In this case, the UE needs to obtain system information of the cell to know how the cell is configured, to access the cell and correctly work in the cell. The system information includes a master information block (MIB) and a system information block (SIB). The MIB is sent by a base station to UE by using a physical broadcast channel (PBCH). The synchronization signal and the PBCH separately occupy different time-frequency resources.

In research of a new radio access technology (NR), a concept of a synchronization signal (SS) block (SS block, SSB) is introduced in consideration of a plurality of beams. There is a configurable mapping relationship between a beam and an SSB. For example, each of a plurality of beams is used to send a different SSB, or two beams may be used to send a same SSB. Each SSB includes an orthogonal frequency division multiplexing (OFDM) symbol used to transmit a PSS, an OFDM symbol used to transmit an SSS, and an OFDM symbol used to transmit a PBCH. A base station sends a synchronization signal and a PBCH in an SSB by using different time-frequency resources.

One or more SSBs form one SS burst, and one or more SS bursts form one SS burst set. Therefore, one SS burst set includes one or more SSBs. One SS burst set is mapped to a predetermined quantity of radio frames for sending. For example, one SS burst set is mapped to two radio frames for sending. In this way, the base station sends the SS burst set periodically, and a period for sending the SS burst set is the predetermined quantity of radio frames.

In consideration of the foregoing sending manner of the SSB, some additional information needs to be carried in the SSB, to implement detection on the SSB by the UE or implement more functions. For example, because one SS burst set may include a plurality of SSBs, an SSB needs to include information used to indicate a ranking of the SSB in a sending period of an SS burst set to which the SSB belongs, to distinguish the SSB from another SSB that belongs to a same SS burst set.

How to carry the additional information in the SSB is a problem that is still under discussion.

SUMMARY

Embodiments of this application provide a broadcast signal sending method and a broadcast signal receiving method, to carry additional information in an SSB.

According to a first aspect, a broadcast signal sending method is provided. The method is performed by a network device, a protocol stack of the network device includes a first protocol layer and a second protocol layer, the second protocol layer is a protocol layer below the first protocol layer, and the method includes generating, by the network device, first information at the first protocol layer, generating, by the network device, second information at the second protocol layer, where the second information is used to determine a time-frequency resource corresponding to one or more synchronization signal blocks SSBs, processing, by the network device, the first information and the second information at the second protocol layer, and sending, by the network device to a terminal device by using a physical broadcast channel PBCH in the SSB, data obtained after second protocol layer processing.

In this embodiment of this application, the network device can send the second information to the terminal device on the PBCH only by processing at a protocol layer below the first protocol layer. Compared with a solution in which all information transmitted on the PBCH is processed in an entire protocol stack below the first protocol layer, this solution shortens a time consumed to process, in the protocol stack, the information transmitted on the PBCH, and helps shorten a service delay.

In a possible implementation, the second protocol layer is a media access control (MAC) layer or a physical layer.

In a possible implementation, the second protocol layer is the physical layer, and the sending, by the network device to a terminal device by using a PBCH in the SSB, data obtained after second protocol layer processing includes sending, by the network device to the terminal device by using the PBCH in the SSB, data obtained after physical layer processing.

In a possible implementation, the second protocol layer is the MAC layer, and the sending, by the network device to a terminal device by using a PBCH in the SSB, data obtained after second protocol layer processing includes performing, by the network device, physical layer processing on the data obtained by second protocol layer processing, and sending, by the network device to the terminal device by using the PBCH in the SSB, data obtained after physical layer processing.

In a possible implementation, the physical layer processing includes one or more of the following manners: channel coding, rate matching, scrambling, modulation, time-frequency resource mapping, and inverse fast Fourier transform (IFFT) processing.

In a possible implementation, the second information is a sequence number of the synchronization signal block SSB.

In a possible implementation, the physical layer processing includes channel coding, rate matching, scrambling, modulation, resource mapping, and inverse fast Fourier transform, and the performing, by the network device, physical layer processing on the first information and the second information includes performing, by the network device, channel coding and/or rate matching by using the first information and the second information as a whole, performing, by the network device, scrambling processing on a result of the channel coding and/or the rate matching by separately using one of J different scrambling codes, to obtain a corresponding scrambling result, where each of N different scrambling codes of the J scrambling codes corresponds to one type of values of the last M bits of a system frame number, J, N, and M are all natural numbers, 1<N≤J, and N=M², performing, by the network device, modulation processing on the scrambling result, to obtain modulated data, and mapping, by the network device, the modulated data to a PBCH in the SSB corresponding to the sequence number of the SSB, and performing IFFT processing on data mapped to each PBCH symbol, to obtain the data obtained after physical layer processing.

In a possible implementation, the physical layer processing includes channel coding, rate matching, scrambling, modulation, resource mapping, and inverse fast Fourier transform, and the performing, by the network device, physical layer processing on the first information and the second information includes performing, by the network device, channel coding and/or rate matching on the first information by using a first coding rate, to obtain a first coding result, and performing, by the network device, channel coding and/or rate matching on the second information by using a second coding rate, to obtain a second coding result, performing, by the network device, scrambling processing on a combination of the first coding result and the second coding result by separately using one of J different scrambling codes, to obtain a corresponding scrambling result, where each of N different scrambling codes of the J scrambling codes corresponds to one type of values of the last M bits of a system frame number, J, N, and M are all natural numbers, 1<N≤J, and N=M², performing, by the network device, modulation processing on the scrambling result, to obtain modulated data, and mapping, by the network device, the modulated data to a PBCH in the SSB corresponding to the sequence number of the SSB, and performing IFFT processing on data mapped to each PBCH symbol, to obtain the data obtained after physical layer processing.

In a possible implementation, the physical layer processing includes channel coding, rate matching, scrambling, modulation, resource mapping, and inverse fast Fourier transform, and the performing, by the network device, physical layer processing on the first information and the second information includes performing, by the network device, channel coding and/or rate matching on the first information by using a first coding rate, to obtain a first coding result, and performing, by the network device, channel coding and/or rate matching on the second information by using a second coding rate, to obtain a second coding result, separately performing, by the network device, scrambling processing on the first coding result and the second coding result by separately using one of J different scrambling codes, to obtain a corresponding first scrambling result and a corresponding second scrambling result, where each of N different scrambling codes of the J scrambling codes corresponds to one type of values of the last M bits of a system frame number, J, N, and M are all natural numbers, 1<N≤J, and N=M², performing, by the network device, modulation processing on a combination of the first scrambling result and the second scrambling result, to obtain modulated data, and mapping, by the network device, the modulated data to a PBCH in the SSB corresponding to the sequence number of the SSB, and performing IFFT processing on data mapped to each PBCH symbol, to obtain the data obtained after physical layer processing.

In a possible implementation, the physical layer processing includes channel coding, rate matching, scrambling, modulation, resource mapping, and inverse fast Fourier transform, and the performing, by the network device, physical layer processing on the first information and the second information includes performing, by the network device, channel coding and/or rate matching on the first information by using a first coding rate, to obtain a first coding result, and performing, by the network device, channel coding and/or rate matching on the second information by using a second coding rate, to obtain a second coding result, separately performing, by the network device, scrambling processing on the first coding result and the second coding result by separately using one of J different scrambling codes, to obtain a corresponding first scrambling result and a corresponding second scrambling result, where each of N different scrambling codes of the J scrambling codes corresponds to one type of values of the last M bits of a system frame number, J, N, and M are all natural numbers, 1<N≤J, and N=M², separately performing, by the network device, modulation processing on the first scrambling result and the second scrambling result, to obtain corresponding first modulated data and corresponding second modulated data, and mapping, by the network device, a combination of the first modulated data and the second modulated data to a PBCH in the SSB corresponding to the sequence number of the SSB, and performing IFFT processing on data mapped to each PBCH symbol, to obtain the data obtained after physical layer processing.

In a possible implementation, the physical layer processing includes channel coding, rate matching, scrambling, modulation, resource mapping, and inverse fast Fourier transform, and the performing, by the network device, physical layer processing on the first information and the second information includes performing, by the network device, channel coding and/or rate matching on the first information by using a first coding rate, to obtain a first coding result, and performing, by the network device, channel coding and/or rate matching on the second information by using a second coding rate, to obtain a second coding result, separately performing, by the network device, scrambling processing on the first coding result and the second coding result by separately using one of J different scrambling codes, to obtain a corresponding first scrambling result and a corresponding second scrambling result, where each of N different scrambling codes of the J scrambling codes corresponds to one type of values of the last M bits of a system frame number, J, N, and M are all natural numbers, 1<N≤J, and N=M², separately performing, by the network device, modulation processing on the first scrambling result and the second scrambling result, to obtain corresponding first modulated data and corresponding second modulated data, mapping, by the network device, the first modulated data to a first resource of a PBCH in the SSB corresponding to the sequence number of the SSB, to obtain a first mapped result, and mapping the second modulated data to a second resource of the PBCH in the SSB corresponding to the sequence number of the SSB, to obtain a second mapped result, and separately performing, by the network device, inverse Fast Fourier transform IFFT processing on the first mapped result and the second mapped result, to obtain a first IFFT result and a second IFFT result, where the first IFFT result and the second IFFT result are the data obtained after physical layer processing.

After encoding is performed at a relatively low coding rate, a decoding result obtained when the terminal device performs corresponding decoding has relatively high reliability. The second information has a relatively high timeliness requirement on control over the behavior of the terminal device, and therefore, the second information may be encoded at a relatively low coding rate. In this way, the terminal device may not need to combine the second information detected in a plurality of frames, and may perform time sequence alignment based only on the second information detected in one frame, thereby greatly accelerating time sequence alignment. Optionally, in the foregoing several possible implementations, the first coding rate is greater than the second coding rate.

In a possible implementation, the first information includes system information. The system information includes one or more of the following: a system bandwidth parameter value, first L-M bits of a system frame number, or configuration information of remaining minimum system information, where the system frame number includes a total of L bits, L and M are both natural numbers, and $1<M \leq L$.

In a possible implementation, the first protocol layer is an RRC layer.

According to a second aspect, a broadcast signal receiving method is provided. The method is performed by a terminal device, a protocol stack of the terminal device includes a first protocol layer and a second protocol layer, the first protocol layer is a protocol layer above the first protocol layer, and the method includes receiving, by the terminal device, data sent by a network device by using a physical broadcast channel PBCH, performing, by the terminal device, physical layer processing on the received data, obtaining, by the terminal device at the second protocol layer, first information and second information from a physical layer processing result, where the second information is used to determine a time-frequency resource corresponding to one or more synchronization signal blocks SSBs carrying the first information, controlling, by the terminal device at the second protocol layer, a behavior of the terminal device based on the second information, and controlling, by the terminal device at the first protocol layer, a behavior of the terminal device based on the first information.

In the broadcast signal receiving method provided in this embodiment of this application, after processing, at the physical layer, the data sent on the PBCH, the terminal device does not need to report, to the first protocol layer for processing, all data obtained after physical layer processing, and instead may directly read the second information thereof at the second protocol layer, and control the behavior of the terminal device based on the second information. Because a time taken by the terminal device to process the second information in a protocol stack is shortened, a service delay can be shortened, and timeliness of a service can be improved.

In a possible implementation, the second protocol layer is a physical layer or a MAC layer.

In a possible implementation, the second protocol layer is the MAC layer, and the obtaining, by the terminal device at the second protocol layer, first information and second information from a physical layer processing result includes processing, by the terminal device at the second protocol layer, the physical layer processing result, and obtaining, by the terminal device, the first information and the second information from data obtained after second protocol layer processing.

In a possible implementation, the receiving, by the terminal device, data sent by a network device by using a PBCH includes detecting, by the terminal device, a synchronization signal, and determining, by using the synchronization signal, a cell identifier and a time-frequency resource that corresponds to the PBCH, and receiving, on the time-frequency resource that corresponds to the PBCH, the data sent by the network device by using the PBCH.

In a possible implementation, the performing, by the terminal device, physical layer processing on the received data includes performing fast Fourier transform FFT processing on received data that is sent by a base station by using a PBCH, demodulating data obtained by the FFT processing, to obtain demodulated data, obtaining J descrambling sequences according to the cell identifier, selecting, by the terminal device, a descrambling sequence from the J descrambling sequences to descramble the demodulated data, and performing, by the terminal device, channel decoding on data obtained by descrambling, and performing CRC check on data obtained by channel decoding, to determine a descrambling sequence that can be used to correctly descramble the demodulated data. A channel decoding result obtained by correct descrambling is used as a physical layer processing result, so that UE obtains the first information and the second information from the physical layer processing result, where the physical layer processing result includes the first information and the second information.

In a possible implementation, the performing, by the terminal device, physical layer processing on the received data includes performing FFT processing on received data that is sent by a base station by using a PBCH, demodulating data obtained by FFT processing, to obtain demodulated data, obtaining J descrambling sequences according to the cell identifier, selecting, by the terminal device, a descrambling sequence from the J descrambling sequences to descramble the demodulated data, obtaining, by the terminal device, included first data and second data from the descrambled data, and performing, by the terminal device, channel decoding on the first data by using a first decoding rate, and performing CRC check on data obtained by channel decoding, to determine a descrambling sequence that can be used to correctly descramble the demodulated data. A channel decoding result obtained by correct descrambling is used as the first information. Channel decoding is performed on the second data by using a second decoding rate, and CRC check is performed on the data obtained by channel decoding, to determine a descrambling sequence that can be used to correctly descramble the demodulated data. A channel decoding result obtained by correct descrambling is used as the second information.

Corresponding to the coding rates, the first decoding rate is greater than the second decoding rate. Because a coding rate used when the base station encodes the second information is relatively low, decoding accuracy of corresponding decoding performed by the terminal device is relatively high. Optionally, in the foregoing possible implementations, the first decoding rate is greater than the second decoding rate.

In a possible implementation, the first information includes system information. The system information includes a system bandwidth, first L-M bits of a system frame number, or configuration information of remaining minimum system information, where the system frame number includes a total of L bits, L and M are both natural numbers, and $1<M \leq L$.

In a possible implementation, the second information is a sequence number of the synchronization signal block SSB.

In a possible implementation, the first protocol layer is an RRC layer.

According to a third aspect, a network device is provided. The network device has a function of implementing the method in the first aspect or any possible implementation of the first aspect. The function may be implemented by using hardware, or implemented by hardware executing corresponding software. The hardware or the software includes one or more modules corresponding to the foregoing function.

According to a fourth aspect, a terminal device is provided. The terminal device has a function of implementing the method in the second aspect or any possible implementation of the second aspect. The function may be implemented by using hardware, or implemented by hardware executing corresponding software. The hardware or the software includes one or more modules corresponding to the foregoing function.

According to a fifth aspect, an embodiment of this application provides a computer storage medium, configured to store a computer software instruction used by the foregoing network device, and including a program designed for executing the first aspect or any possible implementation of the first aspect.

According to a sixth aspect, an embodiment of this application provides a computer storage medium, configured to store a computer software instruction used by the foregoing terminal device, and including a program designed for executing the second aspect or any possible implementation of the second aspect.

According to a seventh aspect, an embodiment of this application further provides a communications system, where the communications system includes the network device according to the third aspect or any possible implementation of the third aspect and the terminal device according to the fourth aspect or any possible implementation of the fourth aspect.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

DETAILED DESCRIPTION OF ILLUSTRATIVE EMBODIMENTS

The following describes technical solutions of this application with reference to accompanying drawings.

Figure 1:
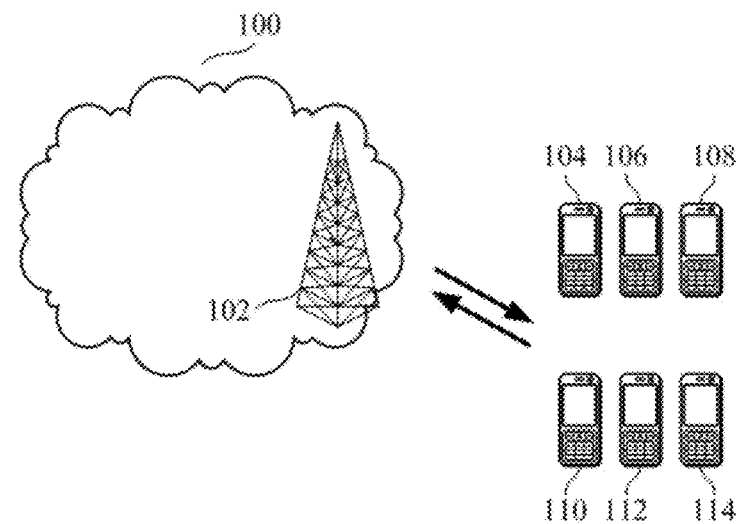
FIG. 1 is a schematic diagram of a network system to which an embodiment of this application is applied.

FIG. 1 is a schematic diagram of a network system to which an embodiment of this application is applied. As shown in FIG. 1, a network system 100 may include a network device 102 and terminal devices 104, 106, 108, 110, 112, and 114. The network device and the terminal devices are connected in a wireless manner. It should be understood that in FIG. 1, descriptions are based on only an example in which the network system includes one network device. However, the embodiments of the present invention are not limited herein. For example, the system may alternatively include more network devices. Similarly, the system may alternatively include more terminal devices.

This specification describes the embodiments with reference to a terminal device. The terminal device may alternatively be UE, an access terminal, a mobile station, a remote station, a remote terminal, a mobile device, a user terminal, or a user agent. Alternatively, the terminal device may be a handheld device having a wireless communication function, a computing device, another processing device connected to a wireless modem, an in-vehicle device, a wearable device, a terminal device in a future 5G network, a terminal device in a future evolved public land mobile network (PLMN), or the like.

As an example rather than a limitation, in the embodiments of the present invention, the terminal device may also be a wearable device. The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but implements a powerful function through software support, data exchange, and cloud interaction. Generalized wearable intelligent devices include full-featured and large-size devices that can implement complete or partial functions without depending on smartphones, such as smart watches or smart glasses, and devices that focus only on one type of application functions and need to work with other devices such as smartphones, such as various smart bands or smart jewelry for monitoring physical signs. In the embodiments of this application, UE is used as an example to describe a structure and a processing procedure of the terminal device.

This specification describes the embodiments with reference to a network device. The network device may be a device configured to communicate with the terminal device. The network device may be a base transceiver station (BTS) in global system for mobile communications (GSM) or code division multiple access (CDMA), or may be a NodeB (NB) in a wideband code division multiple access (WCDMA) system, or may be an evolved NodeB (Evolutional Node B, eNB or eNodeB) in a long term evolution (LTE) system, or may be a radio controller in a cloud radio access network (CRAN) scenario, or a gNodeB (gNB) in a 5G network. In the embodiments of this application, a base station is used as an example to describe a structure and a processing procedure of the network device.

Figure 2:
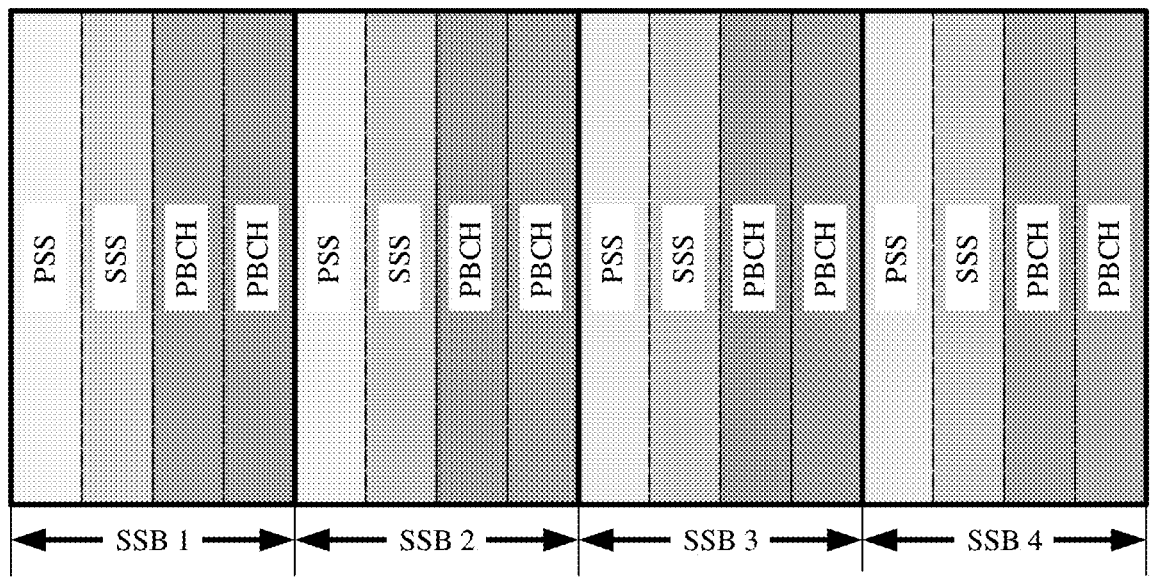
FIG. 2 is a schematic structural diagram of a possible SSB listed in an embodiment of this application.

FIG. 2 is a schematic structural diagram of a possible SSB. One SSB includes a PSS (or a new radio PSS (NR-PSS)) of one OFDM symbol, an SSS (or a new radio SSS (NR-SSS)) of one OFDM symbol, and a PBCH (or a new radio PBCH (NR-PBCH)) of two OFDM symbols. The NR-PSS and the NR-SSS may respectively have functions of a PSS and an SSS in a conventional standard (for example, LTE). For example, the NR-PSS may be used to determine OFDM symbol timing, frequency synchronization, slot timing, and a cell ID within a cell group. The NR-SSS may be used to determine frame timing, a cell group, or the like. Alternatively, the NR-PSS and the NR-SSS may have functions different from those of a current PSS and a current SSS. This is not limited in this embodiment of the present invention. In addition, the NR-PSS and the NR-SSS may use sequences that are separately the same as or different from those of a current PSS and a current SSS. This is not limited either in this embodiment of the present invention. In addition, in this embodiment of the present invention, the NR-PBCH may have a function the same as or different from that of a PBCH in a conventional standard (for example, LTE). This is not limited either in the present invention. Optionally, the NR-PBCH may carry a master information block (MIB).

It should be understood that a resource structure of the SSB shown in FIG. 2 is only a possible structure, and should not constitute any limitation on this embodiment of the present invention. For example, quantities of subcarriers occupied by the NR-PSS, the NR-SSS, and the NR-PBCH in frequency domain may be different, and are not shown in the figure. Alternatively, the NR-PSS, the NR-SSS, and the NR-PBCH may be discontinuous in time. Alternatively, the SSB may only include the NR-PSS and the NR-PBCH, or only include the NR-SSS and the NR-PBCH, or even may only include the NR-PBCH. The resource structure of the SSB is not particularly limited in this embodiment of the present invention.

For how to carry additional information in the SSB, some research proposes to carry additional information in an NR-PBCH resource included in an SSB. The additional information is, for example, a sequence number (Time Index, TI) used to indicate an order of the SSB in a sending period of an SS burst set to which the SSB belongs. However, how the base station indicates the additional information in the NR-PBCH resource and how the UE reads the additional information of the SSB from the NR-PBCH resource are still problems to be resolved.

Figure 3:
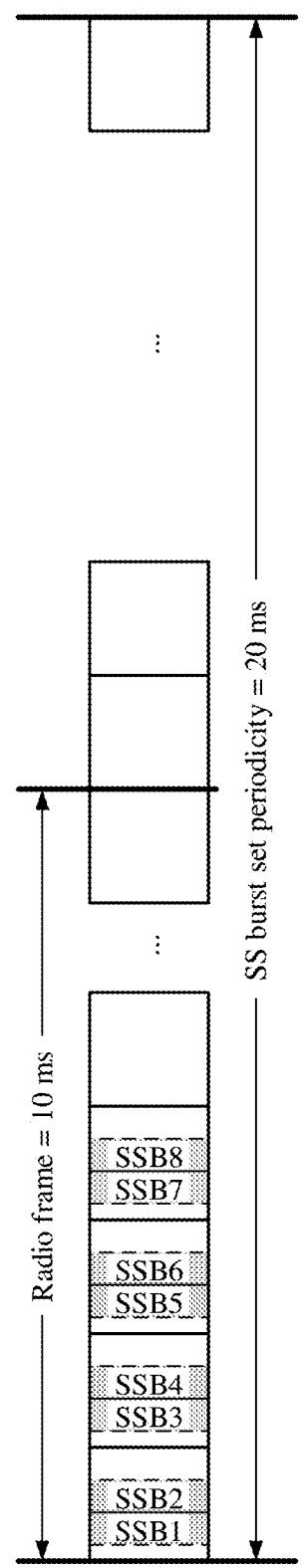
FIG. 3 is a schematic diagram of a sending period of a possible SSB burst set listed in an embodiment of this application.

The additional information introduced due to the SSB may sometimes also implement a plurality of function. Using a TI of the SSB as an example, not only the TI may indicate the order of the SSB in the sending period of the SS burst set to which the SSB belongs, but also SSBs with a same TI are all mapped to a relatively fixed time-frequency resource in the sending period of the SSB burst set to which the SSBs belong. Therefore, after obtaining a TI in one SSB, the UE may infer a boundary of a frame/slot of the cell based on content of the TI and a pre-learned time-frequency resource to which an SSB corresponding to each TI is mapped in the sending period of the SSB burst set, to implement time sequence alignment between the UE and a radio frame of the cell. FIG. 3 is a schematic diagram of a possible SSB sending solution. In FIG. 3, each SS burst set sending period (periodicity) includes two radio frames, each radio frame is 10 ms, and a first radio frame of the SS burst set sending period includes eight SSBs. In each SS burst set sending period, an SSB 2 is mapped to a fixed time-frequency resource in the SS burst set sending period. If the UE knows a TI of an SSB, for example, TI=2, a boundary of a radio frame may be calculated.

However, it is relatively difficult for the UE to implement time sequence alignment based on the TI if a conventional solution for processing content transmitted on the PBCH is used. Referring to a relationship between protocol layers in a protocol stack of 5G and an existing LTE network, if UE wants to obtain information transmitted on a PBCH, the UE needs to process, at a plurality of protocol layers, data received at a physical (PHY) layer, and report the data to radio resource control (RRC), so that the data is read by the RRC layer. Because signal processing at a plurality of protocol layers consumes a relatively long time, it is difficult to implement fast time sequence alignment between the UE and the cell, and a subsequent service delay is caused.

The embodiments of the present invention provide a broadcast signal transmission solution suitable for new radio (NR). Processing procedures at lower protocol layers of the base station and the UE are improved, for example, a processing procedure at a physical layer is improved. From a perspective of the base station, a part of information to be transmitted on the PBCH is generated at a lower protocol layer (for example, a physical layer) of the base station, and not all information to be transmitted on the PBCH is generated at a higher protocol layer (for example, an RRC layer) and sent to the lower protocol layer. From a perspective of the UE, a lower protocol layer of the UE reads a part of information transmitted on the PBCH, and control the UE at the lower protocol layer based on the read part of information, instead of processing, at the lower protocol layer, data received on the PBCH, sending all information obtained by processing to a higher protocol layer for further processing, and then controlling the UE based on information obtained after processing at the higher protocol layer. In this way, a time consumed when the base station and the UE perform protocol layer processing on the part of information can be shortened, so that the UE can be quickly controlled based on the part of information obtained by processing at the lower protocol layer, and a subsequent service delay is shortened. For example, the UE may quickly implement time sequence alignment with a cell based on a TI read at the physical layer.

The following describes the technical solutions in this application in detail with reference to a plurality of accompanying drawings.

Figure 4:
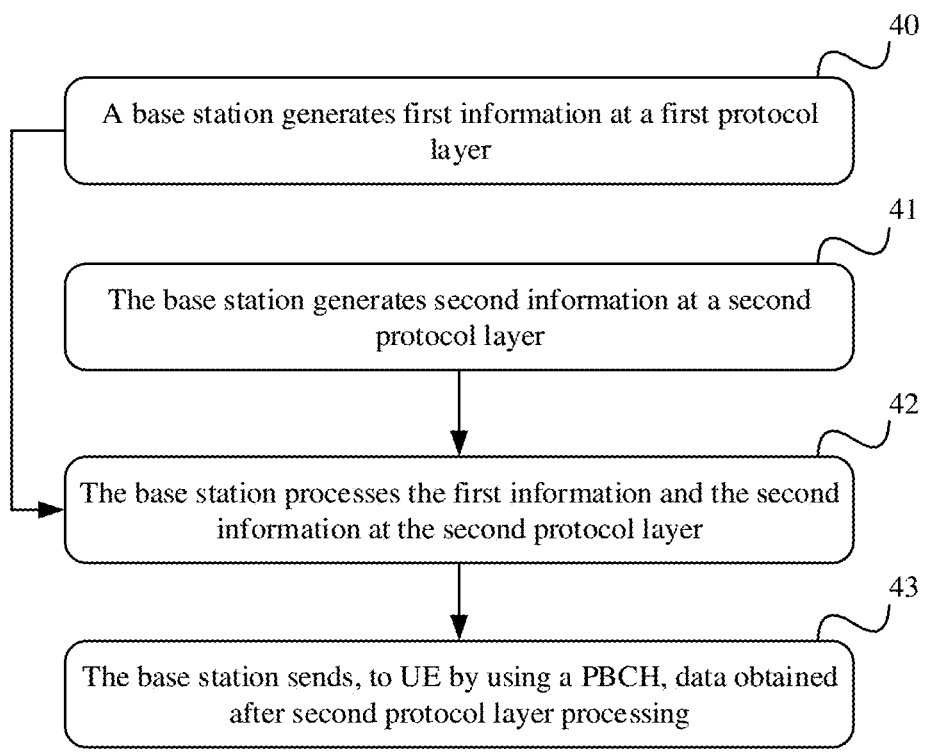
FIG. 4 is a flowchart of a broadcast signal transmission method according to an embodiment of this application.

FIG. 4 is a flowchart of a broadcast signal transmission method according to an embodiment of this application. In FIG. 4, a base station is used as an example to describe the network device 102 in FIG. 1. UE in FIG. 4 may be the terminal devices 104, 106, 108, 110, 112, and 114 in FIG. 1. FIG. 4 is mainly described from a perspective of a base station.

Step 40: The base station generates first information at a first protocol layer. A protocol stack of the base station includes a first protocol layer and a second protocol layer, and the second protocol layer is a protocol layer below the first protocol layer.

In this application, the first protocol layer and the second protocol layer do not indicate a sequence relationship, and instead are used to distinguish between different protocol layers, and first information, second information, and the like mentioned below are also used to distinguish between different information.

Figure 5:
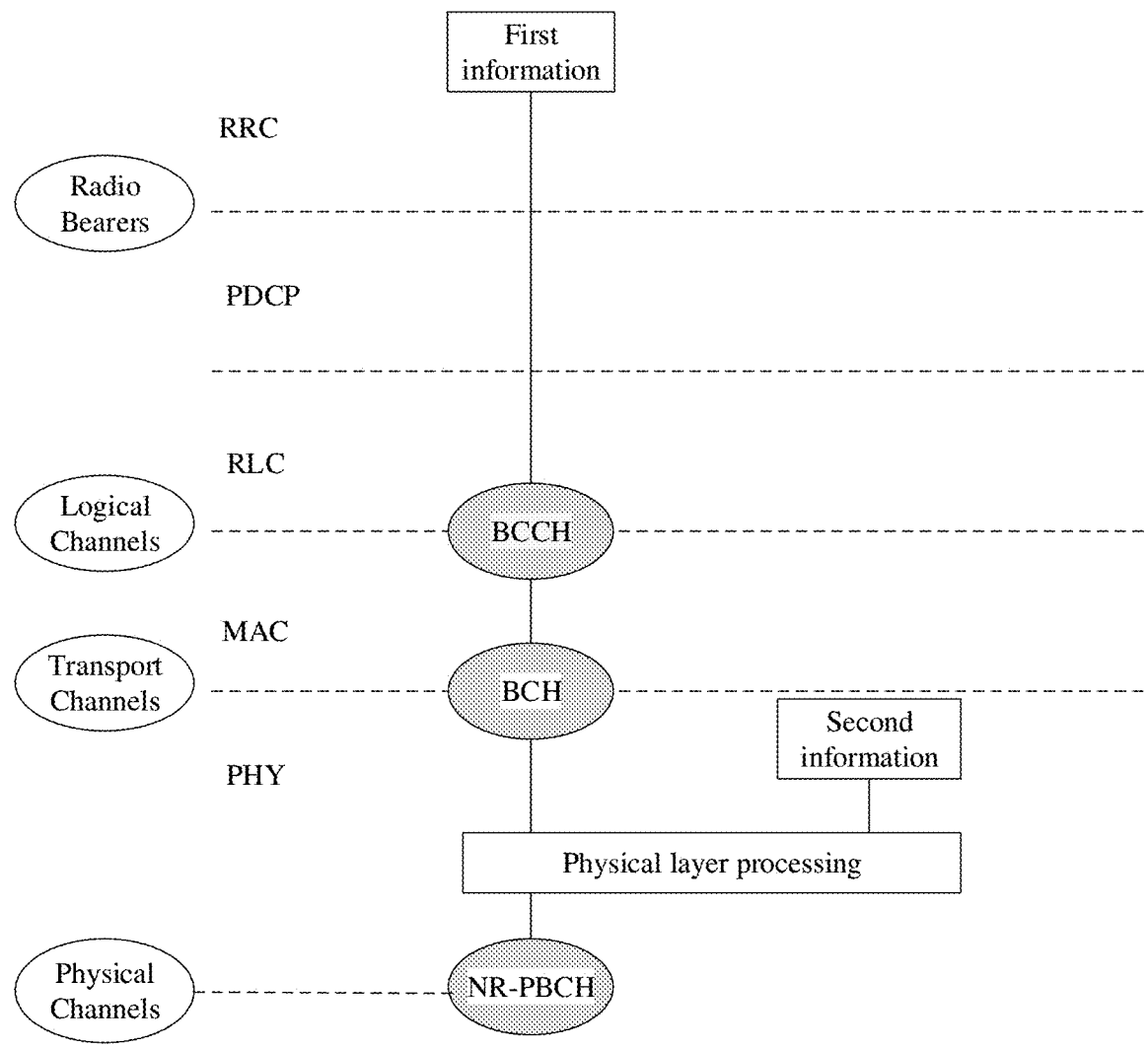
FIG. 5 is a schematic diagram of a broadcast signal sending method with reference to a possible protocol stack structure according to an embodiment of this application.

Optionally, FIG. 5 is a schematic diagram of a broadcast signal sending method with reference to a possible protocol stack structure according to an embodiment of this application. The protocol stack includes five protocol layers that are respectively an RRC layer, a packet data convergence protocol (PDCP) layer, a radio link control (RLC) layer, a media access control (MAC) layer, and a physical (PHY) layer from top to bottom.

It should be noted that, protocol layer division in a 5G network is still under discussion, and the protocol stack shown in FIG. 5 may be improved. For example, a plurality of protocol layers are combined, or a new protocol layer is added. In this embodiment, that the first protocol layer is the RRC layer is only used as an example for description, provided that it is ensured that a relative relationship between the first protocol layer and the second protocol layer is that the first protocol layer is a protocol layer above the second protocol layer.

Optionally, the first information includes system information. The system information may be system information in an LTE network, or may be system information defined in an NR standard. For example, the system information includes a system bandwidth, a system frame number (SFN), or configuration information of remaining minimum system information (RMSI). The configuration information of the RMSI is used to indicate a time-frequency resource and a subcarrier spacing that are used to transmit the RMSI. Some bits in the SFN may be included in the system information, and the other bits may be implicitly indicated by subsequent scrambling at a physical layer. For example, the SFN has a total of 10 bits, and the system information includes the first eight bits of the SFN. The last two bits of the SFN are implicitly indicated by subsequent scrambling at the physical layer.

Step 41: The base station generates second information at the second protocol layer. Optionally, the second protocol layer is a MAC layer or a physical layer. The second information is additional information to be carried in a PBCH symbol of an SSB. The additional information is information related to the SSB. A network may implement more functions based on the additional information. For example, the second information is used to determine a time-frequency resource corresponding to one or more synchronization signal blocks SSBs.

Optionally, the second information is a TI of the SSB. When the base station sends the first information and the second information, the physical layer maps, to the time-frequency resource of the SSB indicated by the TI, data obtained after physical layer processing is performed on the first information and the second information. Specifically, the physical layer subsequently carries, by using an OFDM symbol of the PBCH of the SSB indicated by the TI, the data obtained after physical layer processing is performed on the first information and the second information.

Step 42: The base station processes the first information and the second information at the second protocol layer.

If the second protocol layer is the MAC layer, second protocol layer processing includes determining, at the MAC layer, a format of data sent on an air interface, for example, a size of a data block, and allocating a physical layer resource based on the size of the data block, for example, determining a modulation and coding scheme of the data block, and determining a quantity of subcarriers used to carry the data block.

For example, the second protocol layer is the MAC layer, the first information is system information, and the second information is a TI. After the MAC receives the system information sent by the RRC layer by using a broadcast control channel (BCCH) and a TI of an SSB generated by the MAC layer, the MAC layer determines corresponding control information. The control information includes a size of a data block used to transmit the system information and the TI, a manner of adjusting the data block, and a subcarrier used to carry the data block. Then, the MAC layer separately notifies a physical layer of the data block used to transmit the system information and the TI, the control information, and the like by using a broadcast channel (BCH), or notifies the physical layer of a combination of the information by using the BCH, so that after performing physical layer processing on data received on the BCH, the physical layer sends data obtained after physical layer processing to the UE by using a physical broadcast channel (PBCH).

If the second protocol layer is the physical layer, second protocol layer processing includes channel coding, rate matching, interleaving, scrambling, modulation, time-frequency resource mapping, inverse fast Fourier transform (IFFT), and the like.

For example, the second protocol layer is the physical layer, the first information is system information, and the second information is a TI. After receiving the system information and a TI of an SSB generated by the physical layer, the physical layer performs the foregoing physical layer processing on the system information and the TI. The system information is generated by the RRC layer, is processed by the PDCP layer, the RLC layer, and the MAC layer, and is notified to the physical layer by using a BCH.

Step 43: The base station sends, to UE by using a PBCH in the SSB, data obtained after second protocol layer processing, where the SSB is an SSB determined by the base station based on the second information.

If the second protocol layer is the MAC layer, step 43 specifically includes the following.

Step 1: The base station performs physical layer processing on data obtained by processing at the MAC layer. The physical layer processing includes channel coding, rate matching, interleaving, scrambling, modulation, and the like.

Step 2: The base station sends, to the UE by using the PBCH in the SSB, data obtained after physical layer processing.

If the second protocol layer is the physical layer, step 43 means that the base station sends, to the UE by using the PBCH in the SSB, the data obtained after physical layer processing. Specifically, the base station maps, at the physical layer, the data obtained after physical layer processing to time-frequency resources specified by the SFN and the second information, to send the data to the UE.

In this embodiment of this application, a protocol stack of the network device includes the first protocol layer and the second protocol layer, and the second protocol layer is a protocol layer below the first protocol layer. For the base station, first information in information finally transmitted on the PBCH is generated at the first protocol layer, second information is generated at the second protocol layer, and the second information is used to determine the time-frequency resource corresponding to one or more synchronization signal blocks SSBs. The second information may be sent to the UE on the PBCH only by being processed at a protocol layer below the second protocol layer. Compared with a solution in which all information transmitted on the PBCH is processed in an entire protocol stack below the first protocol layer, this solution shortens a time consumed to process, in the protocol stack, the information transmitted on the PBCH, and helps shorten a service delay.

Figure 6A:
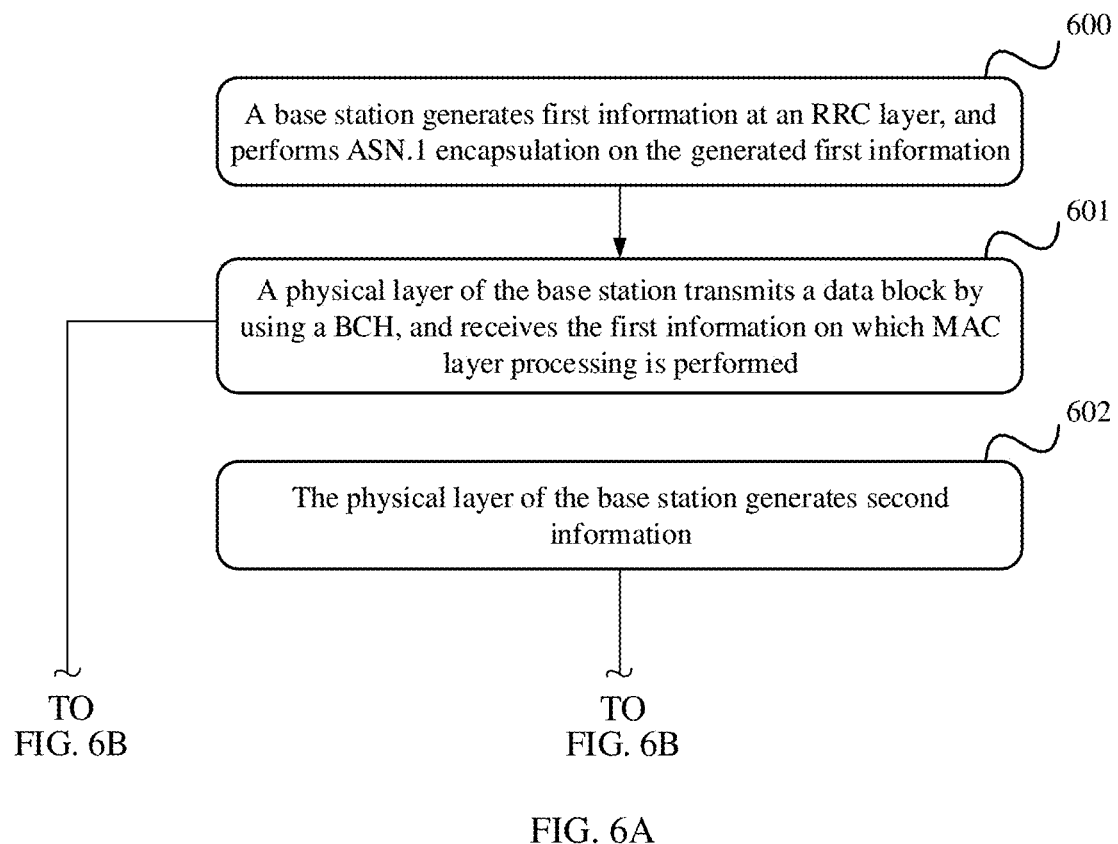
FIG. 6A and FIG. 6B are a flowchart of a broadcast signal sending method according to an embodiment of this application.
Figure 6B:
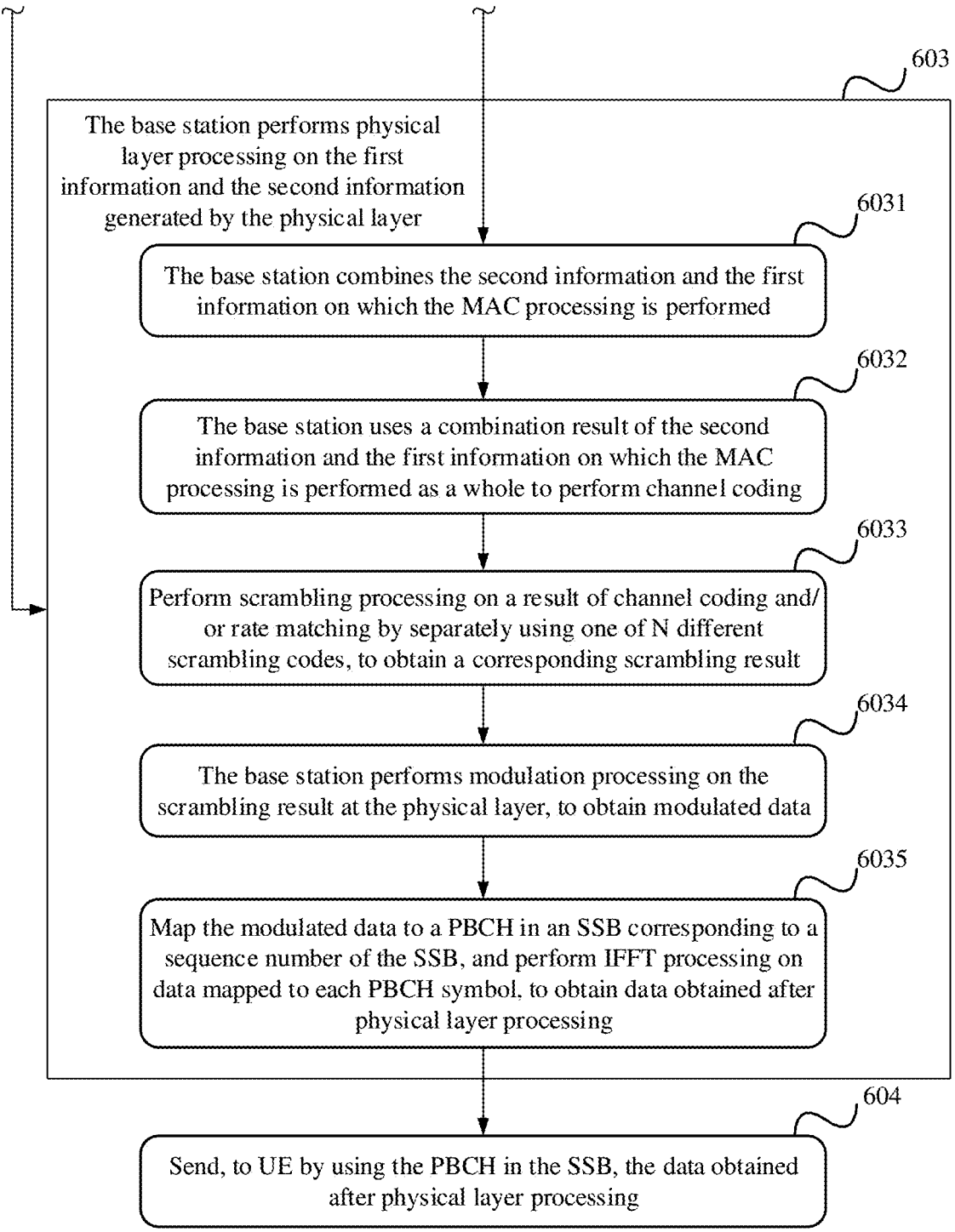
Figure 7:
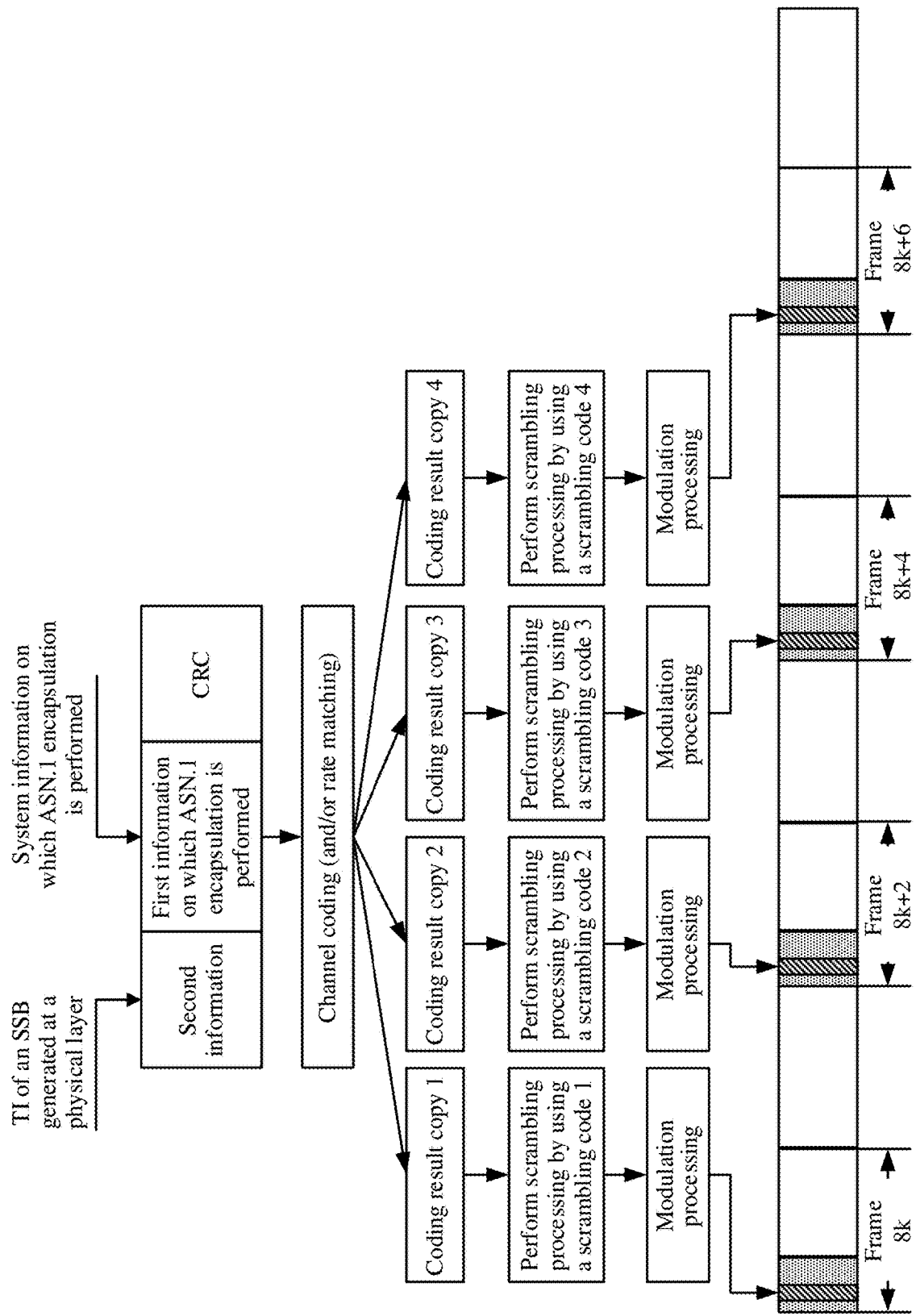
FIG. 7 is a schematic diagram of a broadcast signal sending method according to an embodiment of this application.

In FIG. 6A and FIG. 6B and FIG. 7, that the second protocol layer in FIG. 4 is a physical layer is used as an example to further describe a broadcast signal sending method provided in the embodiments of this application.

FIG. 6A and FIG. 6B are a flowchart of a broadcast signal transmission method according to an embodiment of this application. In FIG. 6A and FIG. 6B, a base station is used as an example to describe the network device 102 in FIG. 1. Further, in FIG. 6A and FIG. 6B, the broadcast signal transmission method provided in this embodiment of this application is described by using an example in which the first protocol layer is an RRC layer and the second protocol layer is a physical layer.

Step 600: A base station generates first information at an RRC layer. The first information includes system information. For description of the system information, refer to the description in the embodiment described in FIG. 4. Details are not described herein again. The RRC layer performs abstract syntax notation one (ASN.1) encapsulation on the generated first information, and sends the first information on which the ASN.1 encapsulation is performed to a MAC layer by using a BCCH. The MAC layer performs MAC layer processing on the received first information on which the ASN.1 encapsulation is performed, and then sends the first information to the physical layer by using a BCH.

Step 601: The physical layer of the base station receives, via a data block transmitted by the BCH, the first information on which MAC layer processing is performed, where the first information is system information generated by the RRC layer.

Step 602: The physical layer of the base station generates second information. Optionally, the second information is a TI of an SSB.

Step 603: The base station performs physical layer processing on the first information on which MAC layer processing is performed and the second information generated by the physical layer.

Optionally, if physical layer processing includes channel coding, scrambling, and modulation, the base station may perform, by using steps 6031 to 6035, physical layer processing on the first information on which the MAC layer processing is performed and the second information generated by the physical layer.

Step 6031: The base station combines the second information and the first information on which the MAC layer processing is performed. Optionally, the physical layer of the base station directly cascades, with the second information and a cyclic redundancy check (CRC) code, the first information on which the ASN.1 encapsulation and MAC layer processing are performed. The cascading specifically means that bits of the first information on which the ASN.1 encapsulation and MAC layer processing are performed, bits of the second information, and bits of the CRC code are successively connected.

Step 6032: The base station uses a combination result of the second information and the first information on which the MAC layer processing is performed as a whole to perform channel coding. That is, the base station performs channel coding on a cascaded result in step 6031.

Optionally, after the channel coding, processing such as rate matching is further included, so that a quantity of information bits in a coding result is consistent with a quantity of allocated time-frequency resource grids after scrambling and/or modulation.

Step 6033: The base station performs scrambling processing on a result of the channel coding and/or the rate matching by separately using one of J different scrambling codes, to obtain a corresponding scrambling result, where each of N different scrambling codes of the J scrambling codes corresponds to one type of values of the last M bits of a system frame number, J, N, and M are all natural numbers, $1<N \leq J$, and $N=M^2$.

In this embodiment of this application, the physical layer determines, according to the SFN, a radio frame used to send data obtained after physical layer processing. A part of the SFN is indicated in the system information, and another part is implicitly indicated by scrambling. For example, the first information includes the first eight bits of the SFN, and the last two bits of the SFN are implicitly indicated by using a scrambling code. The last two bits of the SFN have four possible values in total, which are specifically 00, 01, 10, and 11. Therefore, there are a total of four scrambling code sequences. The scrambling code sequence may be a Zadoff-Chu (ZC) sequence, and each scrambling code sequence corresponds to one type of values of the last two bits of the SFN.

A scrambling code sequence 1 corresponds to the values 00 of the last two bits of the SFN.

A scrambling code sequence 2 corresponds to the values 01 of the last two bits of the SFN.

A scrambling code sequence 3 corresponds to the values 10 of the last two bits of the SFN.

A scrambling code sequence 4 corresponds to the values 11 of the last two bits of the SFN.

The base station selects a scrambling sequence corresponding to the last two bits of the system frame number, to scramble a result of the channel coding and/or the rate matching.

Optionally, in addition to indicating the last two bits of the SFN, the J different scrambling codes may be further used to implicitly indicate some bits of the TI. For example, there are a total of eight different scrambling codes, and each scrambling code corresponds to values of the last two bits of the SFN and 1 bit of the TI.

In FIG. 7, a schematic diagram is used to describe a processing process of step 604 and step 605 in FIG. 6A and FIG. 6B. The base station first scrambles the result of the channel coding/rate matching at the physical layer by using one scrambling code in the four scrambling code sequences, to obtain a scrambling result at the physical layer.

Step 6034: The base station performs modulation processing on the scrambling result at the physical layer, to obtain modulated data.

Optionally, the modulation scheme may be preconfigured, for example, quadrature phase shift keying (QPSK) modulation.

Step 6035: The base station maps the modulated data to a PBCH in the SSB corresponding to a sequence number of the SSB, and performs IFFT processing on data mapped to each PBCH symbol, to obtain the data obtained after physical layer processing.

Optionally, the base station performs the following two steps on the modulated data at the physical layer.

Step 1: The base station determines an L-bit frame number of a radio frame used to send the modulated data, where values of the first L-M bits of the L-bit frame number are indicated in system information, and there is a mapping relationship between values of the last M bits and a scrambling code sequence used to generate the modulated data.

Step 2: The base station maps the modulated data to the PBCH in the SSB corresponding to the sequence number of the SSB, where a mapping result is the data obtained after physical layer processing.

Still for example, the system information includes the first eight bits of the SFN, and the last two bits of the SFN are implicitly indicated by using a scrambling code. Table 1 indicates a correspondence between a scrambling code sequence obtained by scrambling, values of the last two bits of the SFN, and a scrambling result.

TABLE 1

| Scrambling sequence | Values of the last two bits of an SFN | Scrambling result |
|---|---|---|
| ZC sequence 1 | 00 | Scrambling result 1 |
| ZC sequence 2 | 01 | Scrambling result 2 |
| ZC sequence 3 | 10 | Scrambling result 3 |
| ZC sequence 4 | 11 | Scrambling result 4 |

Table 2 indicates a mapping relationship between the values of the last two bits of the SFN and a frame number used to transmit the SSB, where a value of k is a natural number, and k is determined based on values of the first eight bits of the SFN that are included in the first information.

TABLE 2

| Values of the last two bits of an SFN | Frame number |
|---|---|
| 00 | 8k |
| 01 | 8k + 2 |
| 10 | 8k + 4 |
| 11 | 8k + 6 |

Referring to FIG. 7, if the last two bits of the system frame number are 00, the physical layer maps the data obtained after modulation to a radio frame 8k. If the last two bits of the system frame number are 01, the physical layer maps the data obtained after modulation to a radio frame 8k+2. If the last two bits of the system frame number are 10, the physical layer maps the data obtained after modulation to a radio frame 8k+4. If the last two bits of the system frame number are 11, the physical layer maps the data obtained after modulation to a radio frame 8k+6.

Optionally, because the TI may be used to determine a time-frequency resource to which an SSB to which the data obtained after physical layer processing belongs is mapped in an SSB burst set sending period, on one hand, a frame number of a radio frame to which the data obtained after physical layer processing is mapped may be determined by performing step 1. On the other hand, a time-frequency resource to which the data obtained after physical layer processing is mapped in an SSB burst set sending period may be further determined by using the TI. For example, the base station pre-stores information about a time-frequency resource to which an SSB indicated by each TI is mapped in an SSB burst set sending period. Time domain information in the information about the time-frequency resource may be a relative value of the SSB relative to a start location of the SSB burst set sending period. After generating a TI at the physical layer, the base station may search for a time-frequency resource to which an SSB corresponding to the generated TI is mapped in an SSB burst set sending period.

In conclusion, the base station completes resource mapping for the modulated data at the physical layer, that is, determines a frame number of a radio frame used to transmit the data obtained after physical layer processing, and information about a specific time-frequency resource in a radio frame.

Step 604: The base station sends, to UE by using the PBCH in the SSB, the data obtained after physical layer processing.

In the broadcast signal sending method provided in this embodiment of this application, the first information in the information finally transmitted by the base station on the PBCH is generated by the first protocol layer, and the second information is generated by the second protocol layer. The second information may be sent to the UE on the PBCH only by being processed at a protocol layer below the second protocol layer. When performing physical layer processing on the first information and the second information, the base station first uses the first information and the second information as a whole to perform channel coding. Scrambling processing is performed on a result of channel coding by separately using N different scrambling codes, to obtain a scrambling result corresponding to each of the N different scrambling codes, where each of the N different scrambling codes corresponds to one type of values of the last M bits of the system frame number, N and M are both natural numbers, and $N=M^2$. In this way, a part of the SFN is indicated by the first information, and another part of the SFN is implicitly indicated by scrambling. The base station separately performs modulation processing on the scrambling result corresponding to each scrambling code, to obtain N groups of data. The base station determines, based on the SFN and the second information, a time-frequency resource used to send the data obtained after physical layer processing, and then sends, by using the time-frequency resource determined on the PBCH, the data obtained after physical layer processing. When an SSB is sent by using this solution, some additional information related to the SSB can be carried in a PBCH symbol corresponding to the SSB.

Figure 8A:
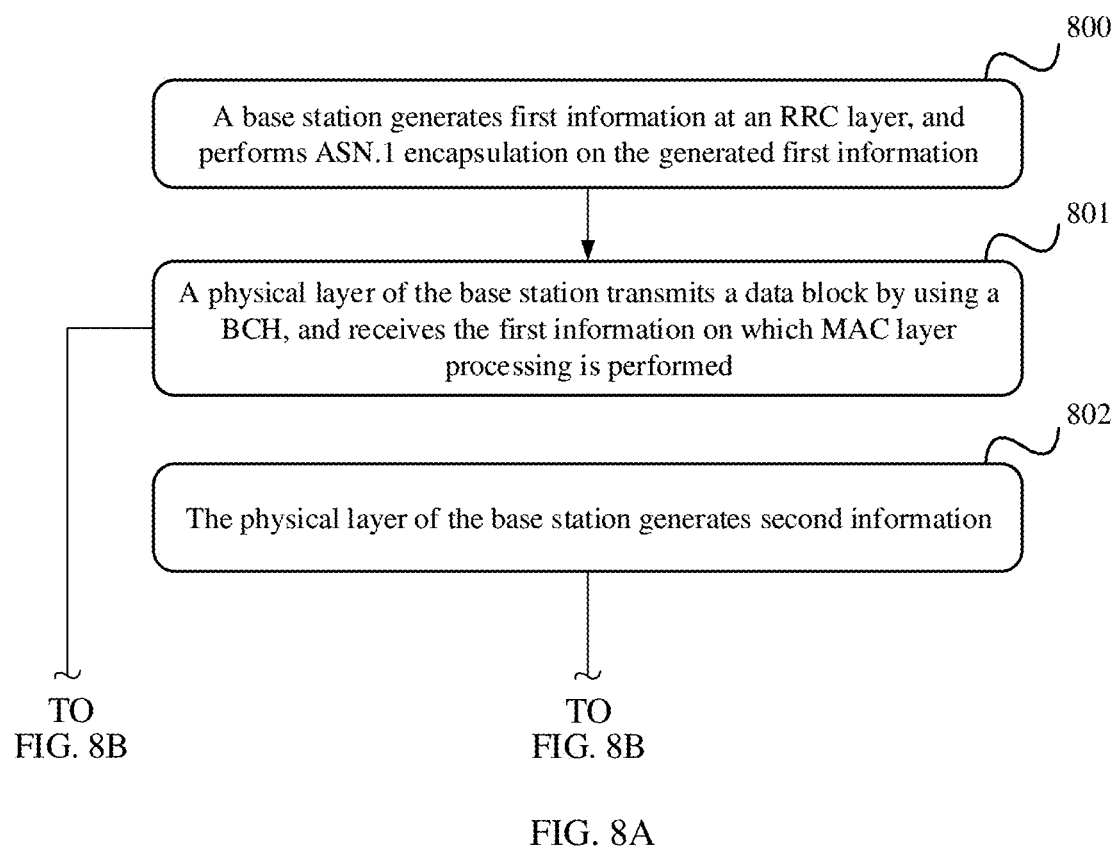
FIG. 8A and FIG. 8B are a flowchart of another broadcast signal sending method according to an embodiment of this application.
Figure 8B:
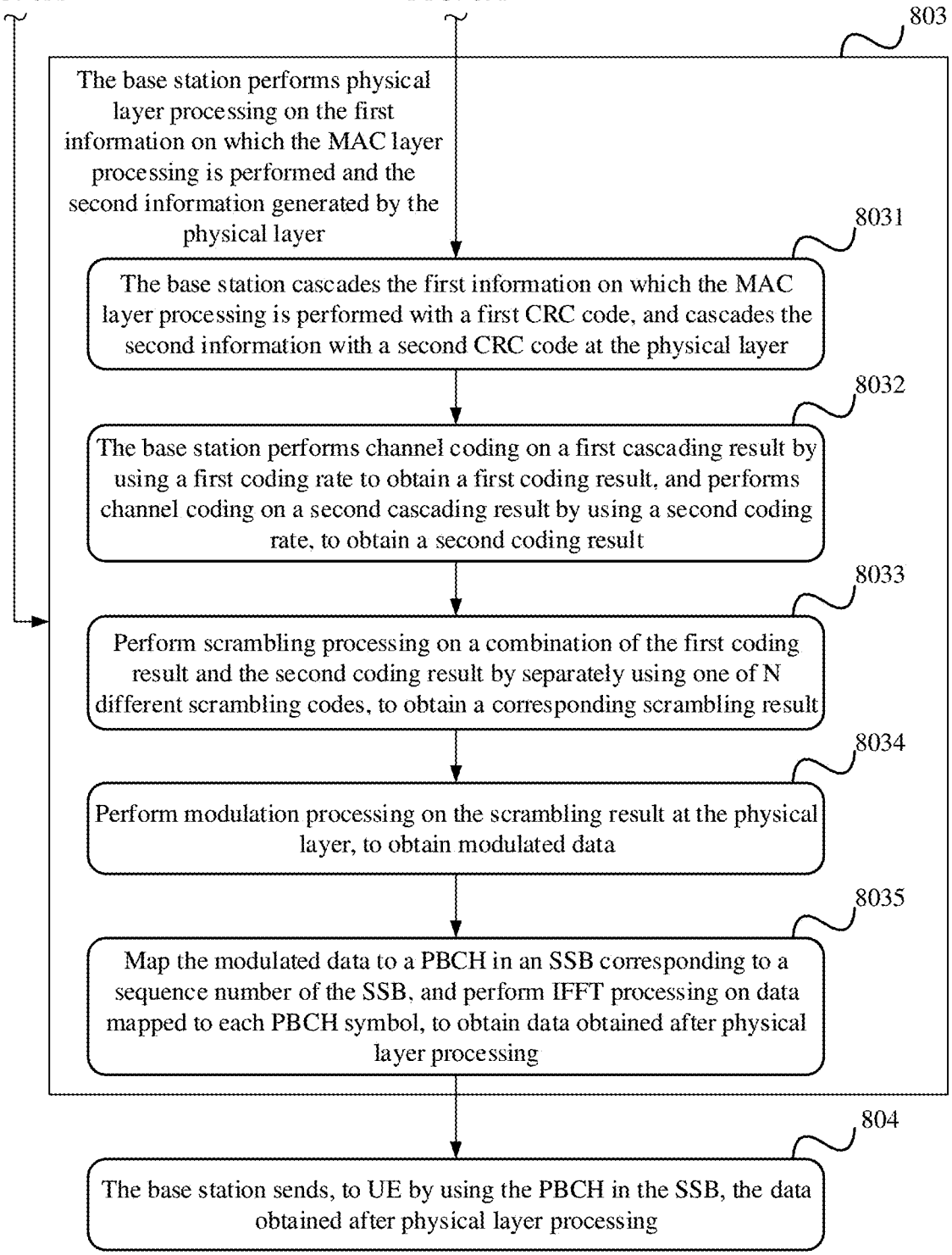
Figure 9:
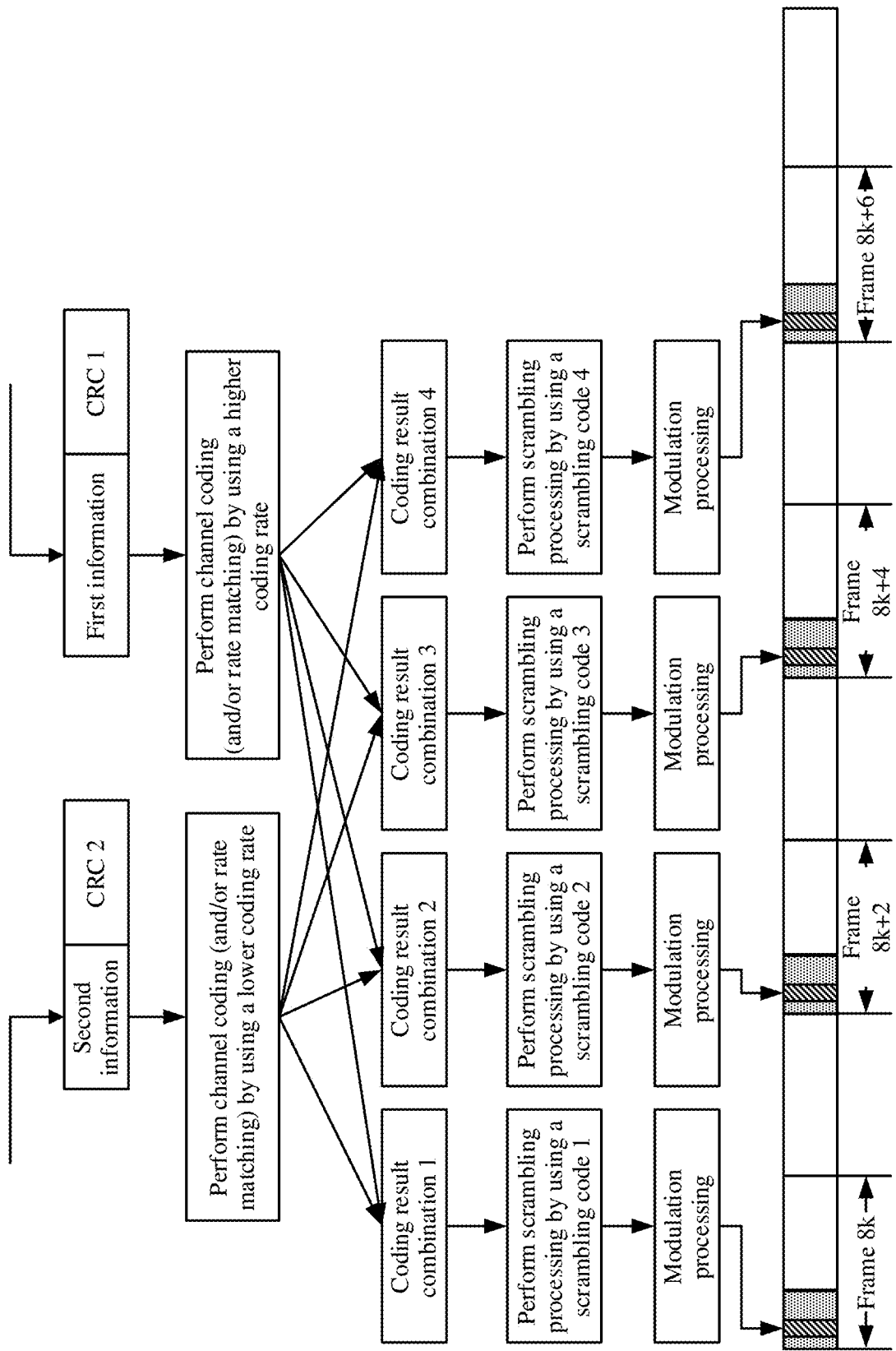
FIG. 9 is a schematic diagram of another broadcast signal sending method according to an embodiment of this application.

In FIG. 8A and FIG. 8B and FIG. 9, that the second protocol layer in FIG. 4 is a physical layer is used as an example to further describe a broadcast signal sending method provided in the embodiments of this application.

FIG. 8A and FIG. 8B are a flowchart of a broadcast signal transmission method according to an embodiment of this application. In FIG. 8A and FIG. 8B, a base station is used as an example to describe the network device 102 in FIG. 1. Further, in FIG. 8A and FIG. 8B, the broadcast signal transmission method provided in this embodiment of this application is described by using an example in which the first protocol layer is an RRC layer and the second protocol layer is a physical layer.

Step 800: A base station generates first information at an RRC layer. The first information includes system information. For description of the system information, refer to the description in the embodiment described in FIG. 4. Details are not described herein again. The RRC layer performs ASN.1 encapsulation on the generated first information, and sends the first information on which the ASN.1 encapsulation is performed to a MAC layer by using a BCCH. The MAC layer performs MAC layer processing on the received first information on which the ASN.1 encapsulation is performed, and then sends the first information to the physical layer by using a BCH.

Step 801: The physical layer of the base station receives, via a data block transmitted by the BCH, the first information on which MAC layer processing is performed. The first information is system information generated by the RRC layer.

Step 802: The physical layer of the base station generates second information. For description of the second information, refer to the description in the foregoing embodiment. Optionally, in this embodiment, the second information is a TI of an SSB.

Step 803: The base station performs physical layer processing on the first information on which the MAC layer processing is performed and the second information generated by the physical layer.

Optionally, if the physical layer processing includes channel coding, scrambling, and modulation, the base station may perform, by using steps 8031 to 8034, physical layer processing on the first information on which the MAC layer processing is performed and the second information.

Step 8031: The base station cascades, at the physical layer, the first information on which the MAC layer processing is performed with a first CRC code, and cascades the second information with a second CRC code.

Optionally, if the physical layer processing includes channel coding, scrambling, and modulation, the base station may perform, by using steps 8031 to 8035, physical layer processing on a result of cascading the first information on which the MAC layer processing is performed and the first CRC code and a result of cascading the second information and the second CRC code.

For brevity, the result of cascading the first information on which the MAC layer processing is performed and the first CRC code is referred to as a first cascading result for short, and the result of cascading the second information and the second CRC code is referred to as a second cascading result for short.

Step 8032: The base station performs channel coding and/or rate matching on the first cascading result by using a first coding rate to obtain a first coding result, and performs channel coding and/or rate matching on the second cascading result by using a second coding rate to obtain a second coding result.

Optionally, after encoding is performed at a relatively low coding rate, a decoding result obtained when UE performs corresponding decoding has relatively high reliability. For example, the TI, has a relatively high timeliness requirement on control over a behavior of the UE, and therefore, the second information may be encoded at a relatively low coding rate. In this way, the UE may not need to combine TIs detected in a plurality of frames, and may perform time sequence alignment based only on a TI detected in one frame, thereby greatly accelerating time sequence alignment. Therefore, when the coding rate is set, the first coding rate may be set to be greater than the second coding rate.

Optionally, after channel coding, processing such as rate matching is further included, so that a data volume in a coding result is consistent with a quantity of allocated resource grids.

Step 8033: The base station performs scrambling processing on a combination of the first coding result and the second coding result by separately using one of J different scrambling codes, to obtain a corresponding scrambling result, where each of N different scrambling codes of the J scrambling codes corresponds to one type of values of the last M bits of a system frame number, J, N, and M are all natural numbers, $1<N\le J$, and $N=M^2$.

For example, the first information includes the first eight bits of the SFN, and the last two bits of the SFN are implicitly indicated by using a scrambling code. The last two bits of the SFN have four possible values in total, which are specifically 00, 01, 10, and 11. Therefore, there are a total of four scrambling code sequences. The scrambling code sequence may be a Zadoff-Chu (ZC) sequence, and each scrambling code sequence corresponds to one type of values of the last two bits of the SFN.

A scrambling code sequence 1 corresponds to the values 00 of the last two bits of the SFN.

A scrambling code sequence 2 corresponds to the values 01 of the last two bits of the SFN.

A scrambling code sequence 3 corresponds to the values 10 of the last two bits of the SFN.

A scrambling code sequence 4 corresponds to the values 11 of the last two bits of the SFN.

In FIG. 9, a schematic diagram is used to describe a processing process of step 804 and step 805 in FIG. 8A and FIG. 8B. Optionally, a combination of the first coding result and the second coding result may be scrambled by using one of different scrambling code sequences. It should be noted that a combination manner of the first coding result and the second coding result may be the same or different each time scrambling is performed.

For example, in a first SS burst set period, each bit in the first coding result and each bit in the second coding result are placed at intervals to generate first combined data, and the first combined data is scrambled by using a ZC sequence 1 in a scrambling code group, to obtain a scrambling result.

For example, in a second SS burst set period, every two bits in the first coding result and every two bits in the second coding result are placed at intervals to generate second combined data, and the second combined data is scrambled by using a ZC sequence 2 in the scrambling code group, to obtain a scrambling result.

For example, in a third SS burst set period, the first coding result and the second coding result are cascaded in such a way that the first coding result is before the second coding result, to generate third combined data, and the third combined data is scrambled by using a ZC sequence 3 in the scrambling code group, to obtain a scrambling result.

For example, in a fourth SS burst set period, the first coding result and the second coding result are cascaded in such a way that the second coding result is before the first coding result, to generate fourth combined data, and the fourth combined data is scrambled by using a ZC sequence 4 in the scrambling code group, to obtain a scrambling result.

Step 8034: The base station performs modulation processing on the scrambling result at the physical layer, to obtain modulated data.

Optionally, the modulation scheme may be preconfigured, for example, QPSK modulation.

Step 8035: The base station maps the modulated data to a PBCH in the SSB corresponding to a sequence number of the SSB, and performs IFFT processing on data mapped to each PBCH symbol, to obtain data after the physical layer processing.

Optionally, the base station performs the following two steps on the modulated data at the physical layer.

Step 1: The base station determines an L-bit frame number of a radio frame used to send the modulated data, where values of the first L-M bits of the L-bit frame number are indicated in system information, and there is a mapping relationship between values of the last M bits and a scrambling code sequence used to generate the modulated data.

Step 2: The base station maps the modulated data to the PBCH in the SSB corresponding to the sequence number of the SSB, where a mapping result is the data obtained after physical layer processing.

Still for example, the first information includes the first eight bits of the SFN, and the last two bits of the SFN are implicitly indicated by using a scrambling code. Table 3 indicates a correspondence between a scrambling code sequence obtained by scrambling, values of the last two bits of the SFN, and a scrambling result.

TABLE 3

| Scrambling sequence | Values of the last two bits of an SFN | Scrambling result |
| --- | --- | --- |
| ZC sequence 1 | 00 | Scrambling result 1 |
| ZC sequence 2 | 01 | Scrambling result 2 |
| ZC sequence 3 | 10 | Scrambling result 3 |
| ZC sequence 4 | 11 | Scrambling result 4 |

Table 4 indicates a mapping relationship between the values of the last two bits of the SFN and a frame number used to transmit the SSB, where a value of k is a natural number, and k is determined based on the first eight bits of the SFN that are included in the first information.

TABLE 4

| Values of the last two bits of an SFN | Frame number |
| --- | --- |
| 00 | 8k |
| 01 | 8k + 2 |
| 10 | 8k + 4 |
| 11 | 8k + 6 |

Referring to FIG. 9, if the last two bits of the system frame number are 00, the physical layer maps the data obtained after modulation to a radio frame 8k. If the last two bits of the system frame number are 01, the physical layer maps the data obtained after modulation to a radio frame 8k+2. If the last two bits of the system frame number are 10, the physical layer maps the data obtained after modulation to a radio frame 8k+4. If the last two bits of the system frame number are 10, the physical layer maps the data obtained after modulation to a radio frame 8k+6.

Optionally, because the TI may be used to determine a time-frequency resource to which an SSB to which the data obtained after physical layer processing belongs is mapped in an SSB burst set sending period, on one hand, a frame number of a radio frame to which the data obtained after physical layer processing is mapped may be determined by performing step 1. On the other hand, a time-frequency resource to which the data obtained after physical layer processing is mapped in an SSB burst set sending period may be further determined by using the TI. For example, the base station pre-stores information about a time-frequency resource to which an SSB indicated by each TI is mapped in an SSB burst set sending period. Time domain information in the information about the time-frequency resource may be a relative value of the SSB relative to a start location of the SSB burst set sending period. After generating a TI at the physical layer, the base station may search for a time-frequency resource to which an SSB corresponding to the generated TI is mapped in an SSB burst set sending period.

In conclusion, the base station completes resource mapping for the modulated data at the physical layer, that is, determines a frame number of a radio frame used to transmit the data obtained after physical layer processing, and information about a specific time-frequency resource in a radio frame.

Step 804: The base station sends, to the UE by using the PBCH in the SSB, the data obtained after physical layer processing.

In the broadcast signal sending method provided in this embodiment of this application, the first information in the information transmitted by the base station on the PBCH is generated by the first protocol layer, and the second information is generated by the second protocol layer. The second information may be sent to the UE on the PBCH only by being processed at a protocol layer below the second protocol layer. A difference from the embodiment shown in FIG. 6A and FIG. 6B is that when performing physical layer processing on the first information and the second information, the base station separately performs channel coding on the first information and the second information to obtain two channel coding results. Scrambling processing is performed on a combination of the two channel coding results by separately using N different scrambling codes, to obtain a scrambling result corresponding to each of the N different scrambling codes. On the basis that an effect of the embodiment shown in FIG. 6A and FIG. 6B can be achieved, when the first information and the second information are encoded by using different coding rates, a lower coding rate is set for the second information, to improve accuracy of detecting the second information by the UE. Therefore, timeliness of controlling a behavior of the UE by a UE side based on the second information is improved, and a service delay is further shortened.

Figure 10:
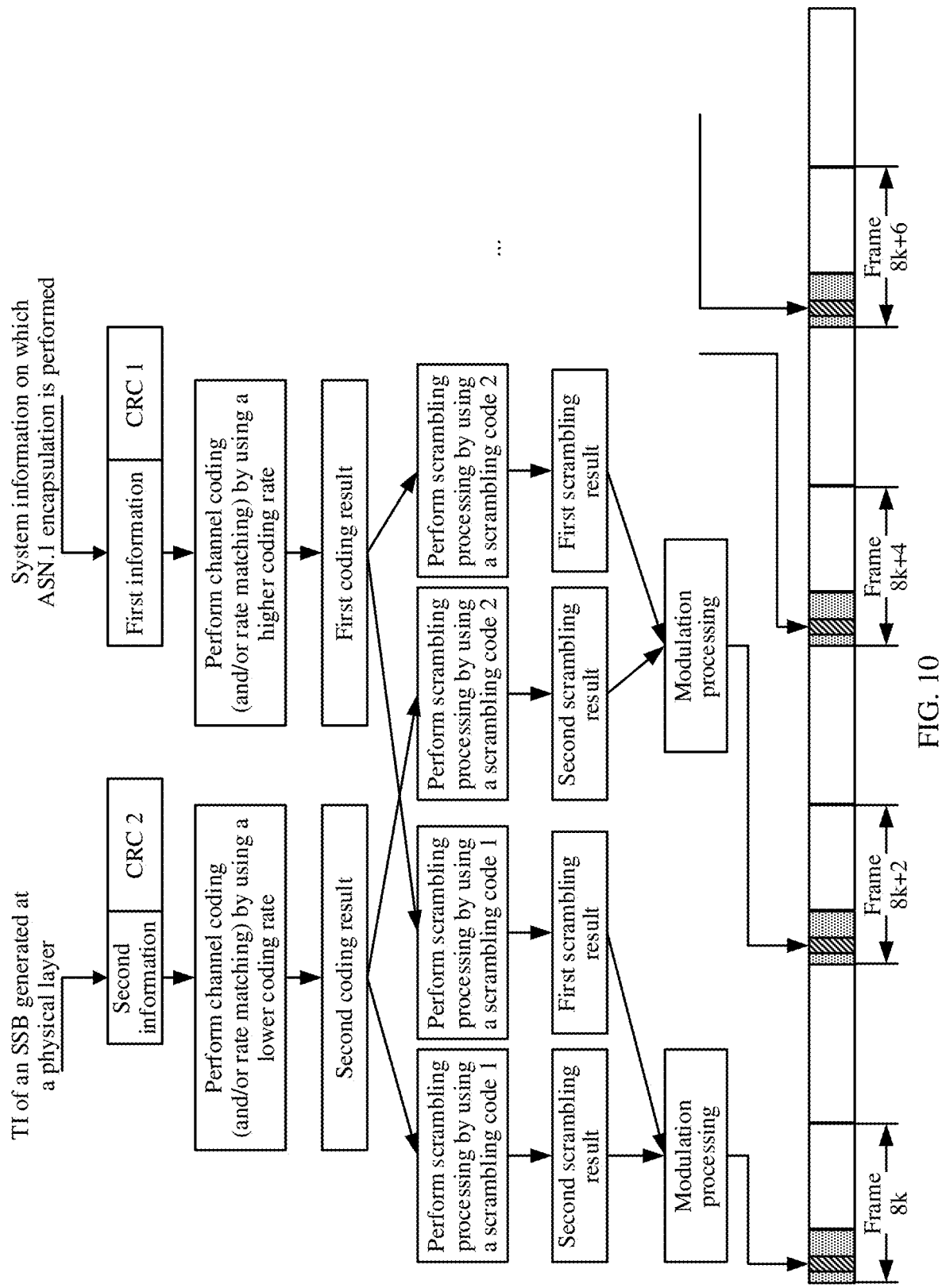
FIG. 10 is a schematic diagram of another broadcast signal sending method according to an embodiment of this application.

FIG. 10 is a schematic diagram of another physical layer processing process according to an embodiment of this application. During physical layer processing, after separately scrambling a channel coding result of first information and a channel coding result of second information, the base station performs modulation and resource mapping on a combination of the scrambling results. As shown in FIG. 10, at a physical layer, the base station performs channel coding and/or rate matching on the first information by using a first coding rate to obtain a first coding result, and performs channel coding and/or rate matching on the second information by using a second coding rate, to obtain a second coding result. The base station separately performs scrambling processing on the first coding result and the second coding result by using one of J different scrambling codes, to obtain a corresponding first scrambling result and a corresponding second scrambling result, where each of N different scrambling codes of the J scrambling codes corresponds to one type of values of the last M bits of a system frame number, N and M are both natural numbers, $1 < M \leq J$, and $N = M^2$. In FIG. 10, due to limited space, scrambling processing of data in one radio frame is only used as an example for description, and cases of other three radio frames are similar. Further, the base station performs modulation processing on a combination of the first scrambling result and the second scrambling result, to obtain modulated data. The base station maps the modulated data to a PBCH in an SSB corresponding to a sequence number of the SSB, and performs IFFT processing on data mapped to each PBCH symbol, to obtain data processed by the physical layer.

Figure 11:
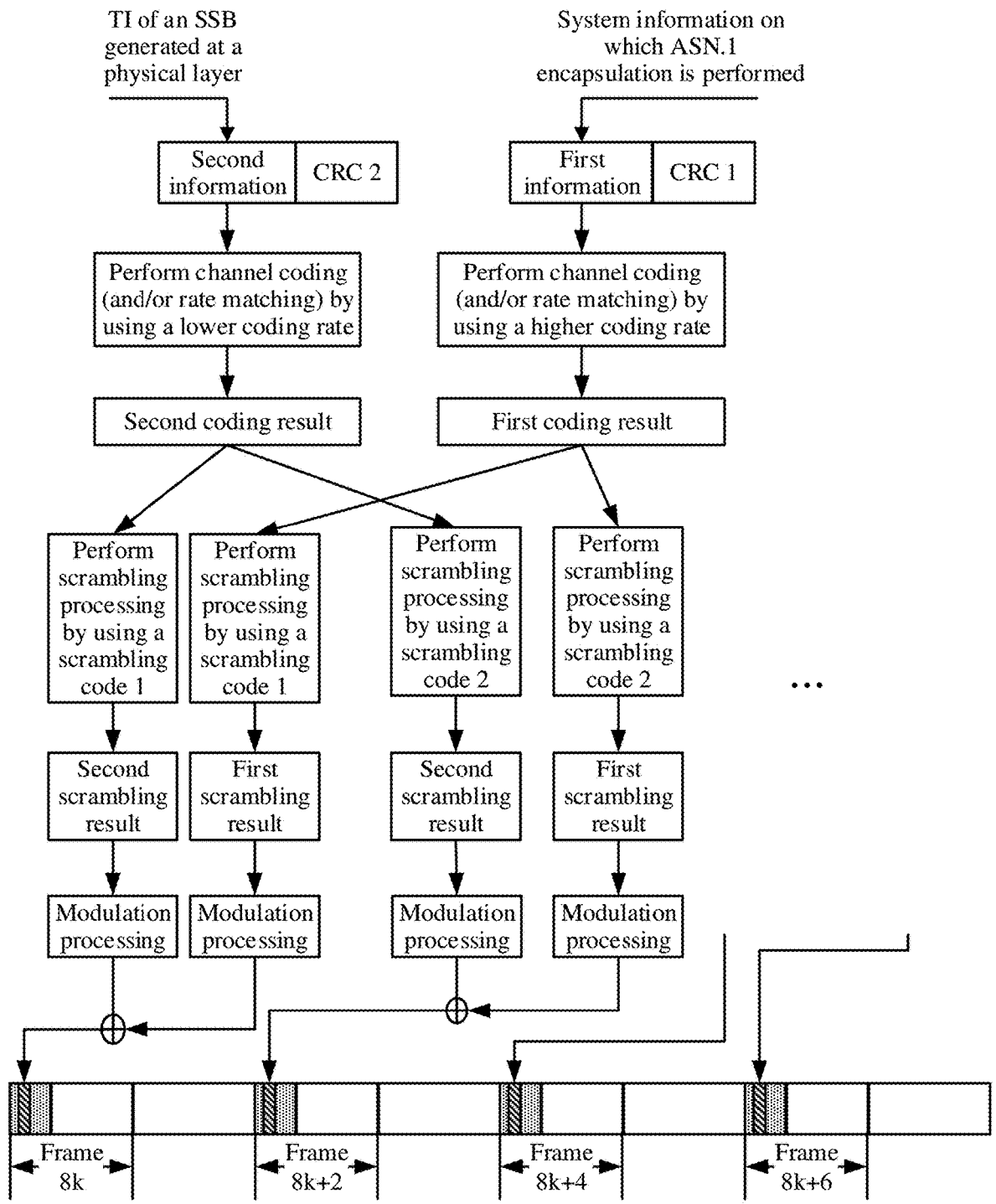
FIG. 11 is a schematic diagram of another broadcast signal sending method according to an embodiment of this application.

FIG. 11 is a schematic diagram of another physical layer processing process according to an embodiment of this application. During physical layer processing, after separately scrambling and modulating a channel coding result of first information and a channel coding result of second information, the base station performs resource mapping after results of separate modulation are combined. As shown in FIG. 11, at a physical layer, the base station performs channel coding and/or rate matching on the first information by using a first coding rate to obtain a first coding result, and performs channel coding and/or rate matching on the second information by using a second coding rate, to obtain a second coding result. The base station separately performs scrambling processing on the first coding result and the second coding result by separately using one of J different scrambling codes, to obtain a corresponding first scrambling result and a corresponding second scrambling result, where each of N different scrambling codes of the J scrambling codes corresponds to one type of values of the last M bits of a system frame number, J, N, and M are all natural numbers, $1 < N \leq J$, and $N = M^2$. Further, the base station separately performs modulation processing on the first scrambling result and the second scrambling result, to obtain corresponding first modulated data and corresponding second modulated data. The base station maps a combination of the first modulated data and the second modulated data to a PBCH in an SSB corresponding to a sequence number of the SSB, and performs IFFT processing on data mapped to each PBCH symbol, to obtain data after the physical layer processing.

Figure 12:
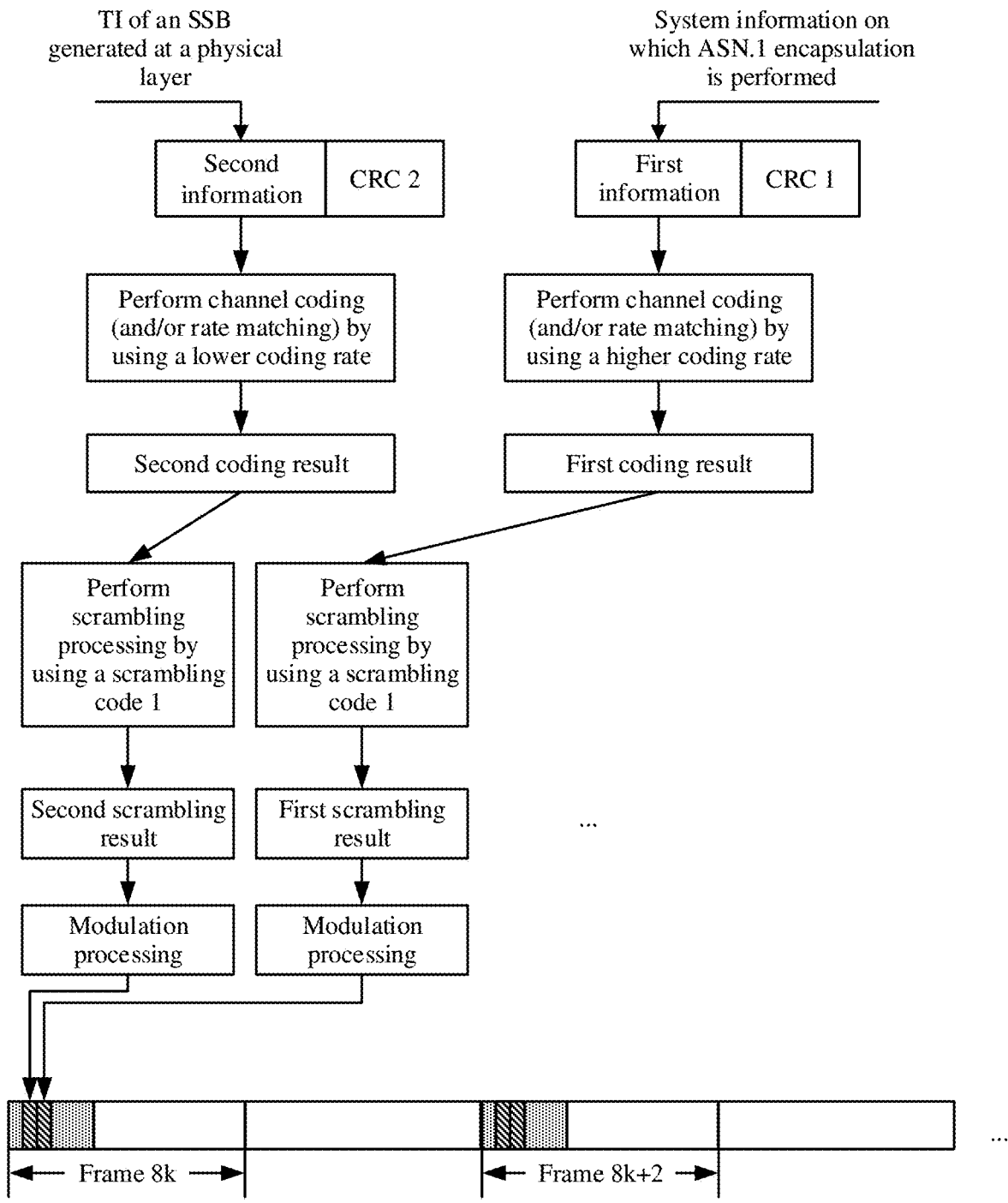
FIG. 12 is a schematic diagram of another broadcast signal sending method according to an embodiment of this application.

FIG. 12 is a schematic diagram of another physical layer processing process according to an embodiment of this application. During physical layer processing, after separately scrambling and modulating a channel coding result of first information and a channel coding result of second information, the base station separately performs resource mapping, and then performs IFFT on a mapped result. As shown in FIG. 12, the base station performs channel coding and/or rate matching on the first information by using a first coding rate to obtain a first coding result, and performs channel coding and/or rate matching on the second information by using a second coding rate, to obtain a second coding result. The base station separately performs scrambling processing on the first coding result and the second coding result by separately using one of J different scrambling codes, to obtain a corresponding first scrambling result and a corresponding second scrambling result, where each of N different scrambling codes of the J scrambling codes corresponds to one type of values of the last M bits of a system frame number, J, N, and M are all natural numbers, $1 < N \leq J$, and $N = M^2$. Further, the base station separately performs modulation processing on the first scrambling result and the second scrambling result, to obtain corresponding first modulated data and corresponding second modulated data. The base station maps the first modulated data to a first resource of a PBCH in an SSB corresponding to a sequence number of the SSB, to obtain a first mapped result, and maps the second modulated data to a second resource of the PBCH in the SSB corresponding to the sequence number of the SSB, to obtain a second mapped result. Optionally, the resource corresponding to the PBCH in the SSB includes two symbols in time domain and a section of subcarriers in frequency domain. The first resource may be a first symbol in time domain and the second resource is a second symbol in time domain, and subcarrier ranges corresponding to the first resource and the second resource are the same. Certainly, the PBCH in the SSB may be alternatively divided into the first resource and the second resource in another division manner, for example, division of a frequency domain subcarrier range. The base station separately performs IFFT processing on the first mapped result and the second mapped result, to obtain a first IFFT result and a second IFFT result, where the first IFFT result and the second IFFT result are data obtained after physical layer processing.

Similar to the embodiment shown in FIG. 8A and FIG. 8B, in physical layer processing processes shown in FIG. 10 to FIG. 12, the base station may set a lower coding rate for the second information, to improve accuracy of detecting the second information by the UE. Therefore, timeliness of controlling a behavior of the UE by a UE side based on the second information is improved, and a service delay is further shortened. That is, the second coding rate is less than the first coding rate.

Figure 13:
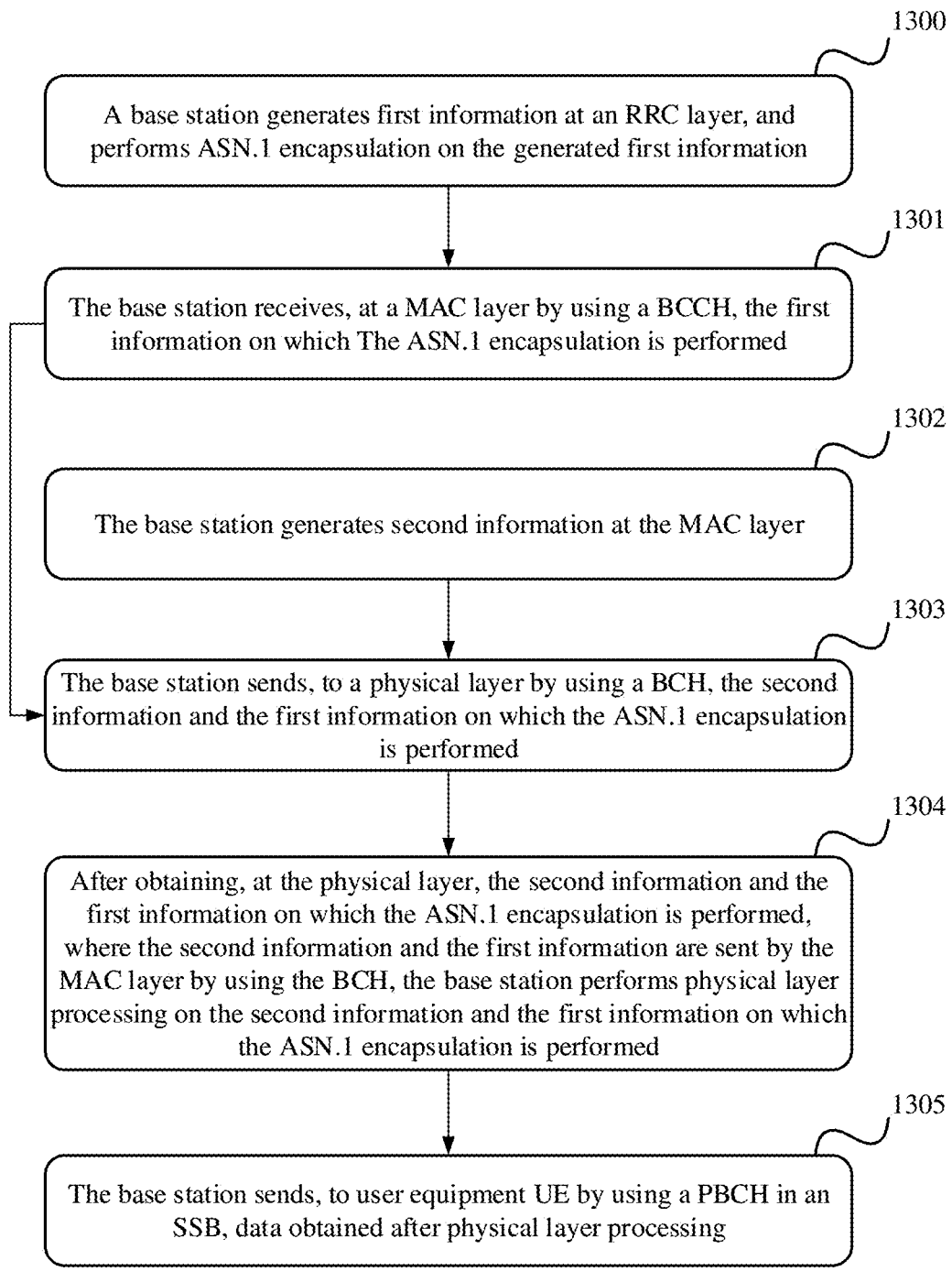
FIG. 13 is a flowchart of a broadcast signal sending method according to an embodiment of this application.
Figure 14:
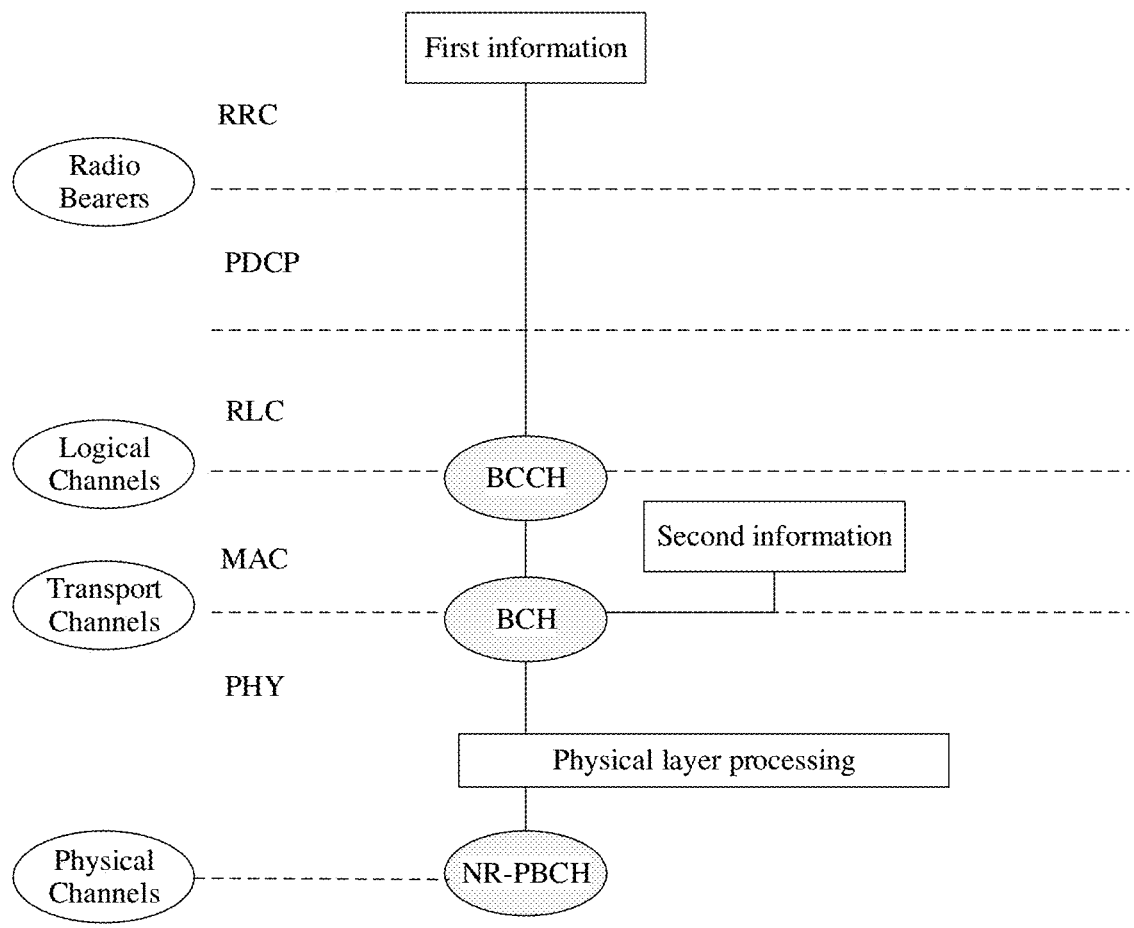
FIG. 14 is a schematic diagram of a broadcast signal sending method according to an embodiment of this application.

In FIG. 13, that the second protocol layer in FIG. 4 is a MAC layer is used as an example to further describe a broadcast signal sending method provided in the embodiments of this application. FIG. 14 is a schematic diagram of a broadcast signal sending method with reference to a possible protocol stack structure according to an embodiment of this application.

The broadcast signal sending method shown in FIG. 13 includes the following steps.

Step 1300: A base station generates first information at an RRC layer. The first information includes system information. For description of the system information, refer to the description in the embodiment described in FIG. 4. Details are not described herein again. The base station performs ASN.1 encapsulation on the generated first information at the RRC layer, and sends the first information on which the ASN.1 encapsulation is performed to a MAC layer by using a BCCH.

Step 1301: The base station receives, at the MAC layer by using the BCCH, the first information on which the ASN.1 encapsulation is performed.

Step 1302: The base station generates second information at the MAC layer. For description of the second information, refer to the description in the foregoing embodiment. Details are not described herein again. Optionally, the second information is a TI of an SSB.

Step 1303: The base station sends, to a physical layer by using a BCH, the second information and the first information on which the ASN.1 encapsulation is performed.

Step 1304: After obtaining, at the physical layer, the second information and the first information on which the ASN.1 encapsulation is performed, where the second information and the first information are sent by the MAC layer by using the BCH, the base station performs physical layer processing on the second information and the first information on which the ASN.1 encapsulation is performed.

For a process in which the base station performs physical layer processing on the second information and the first information on which the ASN.1 encapsulation is performed, refer to the descriptions in FIG. 6A and FIG. 6B to FIG. 9, and details are not described herein again.

Step 1305: The base station sends, to user equipment UE by using a PBCH in the SSB, data obtained after physical layer processing. For a process in which the base station sends, to the user equipment UE by using the PBCH, the data obtained after physical layer processing, refer to the descriptions in FIG. 6A and FIG. 6B to FIG. 9, and details are not described herein again.

Figure 15:
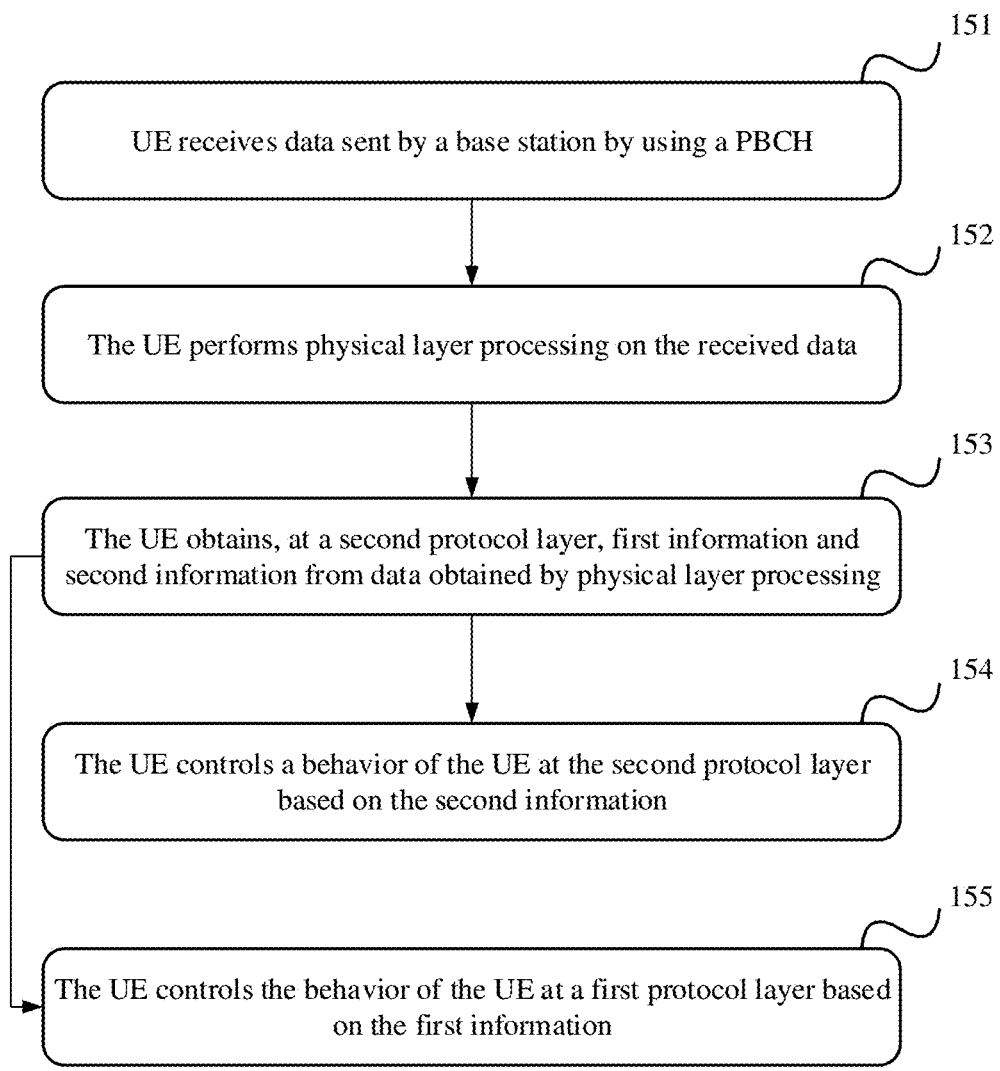
FIG. 15 is a flowchart of a broadcast signal receiving method according to an embodiment of this application.

FIG. 15 is a flowchart of a broadcast signal receiving method according to an embodiment of this application. In FIG. 15, UE is used as an example to describe the terminal devices 104, 106, 108, 110, 112, and 114 in FIG. 1. FIG. 15 is mainly described from a perspective of UE. The UE in this embodiment may be the terminal device 102 in FIG. 1. Optionally, the UE may interact with the base station in FIG. 4 to FIG. 14.

Step 151: The UE receives data sent by a base station by using a PBCH. A protocol stack of the UE includes a first protocol layer and a second protocol layer, and the first protocol layer is a protocol layer above the second protocol layer.

The protocol stack of the UE and a protocol stack of the base station have a similar structure, but functions of protocol layers are different. For examples of protocol layers in the protocol stack of the UE, refer to FIG. 5 or FIG. 11. It should be noted that, protocol layer division in a 5G network is still under discussion, and the protocol stack shown in FIG. 5 may be improved, for example, a plurality of protocol layers are combined, or a new protocol layer is added.

Optionally, the first protocol layer is an RRC layer, and the second protocol layer is a MAC layer or a physical layer. In this embodiment, that the first protocol layer is an RRC layer is only used as an example for description, provided that it is ensured that a relative relationship between the first protocol layer and the second protocol layer is that the first protocol layer is a protocol layer above the second protocol layer.

Step 152: The UE performs physical layer processing on the received data.

Optionally, the physical layer processing includes fast Fourier transform (FFT), demodulation, descrambling, de-interleaving, channel decoding, and the like.

Step 153: The UE obtains, at the second protocol layer, first information and second information from data obtained by physical layer processing.

Optionally, the first information includes system information. For description of the system information, refer to the description in FIG. 4. Repetitions are not described herein again.

Optionally, the second information is used to determine a time-frequency resource corresponding to one or more synchronization signal blocks SSBs carrying the first information.

If the second protocol layer is the MAC layer, the MAC layer obtains, by using a BCH, the data obtained by physical layer processing, processes the data obtained from the BCH, and obtains the first information and the second information from the data after MAC layer processing. The UE controls a behavior of the UE at the MAC layer based on the second information, and sends the first information to an RRC layer by using a BCCH. The MAC layer processing includes decapsulation and the like.

If the second protocol layer is a physical layer, after performing physical layer processing on the data received on the PBCH, the physical layer obtains the first information and the second information from a physical layer processing result.

Step 154: The UE controls a behavior of the UE at the second protocol layer based on the second information.

If the second protocol layer is the MAC layer, the UE controls the behavior of the UE at the MAC layer based on the second information, and sends the first information to an RRC layer by using a BCCH.

If the second protocol layer is a physical layer, the UE controls the behavior of the UE at the physical layer based on the second information, and sends the first information to a MAC layer by using a BCH. Further, the UE sends the first information to an RRC layer at the MAC layer by using a BCCH.

For example, the second protocol layer is a physical layer, and the second information is a TI. After obtaining the TI, the physical layer may infer, based on a time-frequency resource used by the physical layer to receive the data and a pre-learned relative location of a resource to which an SSB identified by the TI is mapped in an SSB burst set sending period, a start location of the SSB burst set sending period to which the SSB carrying the data belongs, and uses the start location as a boundary of a radio frame of a cell, thereby implementing time sequence alignment.

The sending manner of the SSB shown in FIG. 3 is still used as an example.

Assuming that the UE receives a PBCH symbol in an SSB 1 on a time-frequency resource 1, the UE may infer, based on a relative location to which the SSB 1 is mapped in an SSB burst set sending period, a start location of the SSB burst set sending period to which the SSB 1 belongs, and uses the start location as a boundary of a radio frame of a cell, thereby implementing time sequence alignment.

Step 155: The UE controls the behavior of the UE at the first protocol layer based on the first information.

Optionally, for example, the first protocol layer is an RRC layer, and the first information is system information. In this case, after reading the system information at the RRC layer, the UE may learn a channel resource configuration status of the cell, to access the cell.

In the broadcast signal receiving method provided in this embodiment of this application, a protocol stack of the UE includes the first protocol layer and the second protocol layer, and the first protocol layer is a protocol layer above the second protocol layer. The UE receives the data sent by the base station by using the PBCH. After the UE performs physical layer processing on the received data, the UE obtains, at the second protocol layer, the first information and the second information from data obtained by physical layer processing. The UE controls the behavior of the UE at the second protocol layer based on the second information, and controls the behavior of the UE at the first protocol layer based on the first information. After processing, at the physical layer, the data sent on the PBCH, the UE does not need to report, to the first protocol layer for processing, all data obtained after physical layer processing, and instead may directly read the second information thereof, for example, information used to determine a time-frequency resource corresponding to one or more synchronization signal blocks SSBs, at the second protocol layer, and control the behavior of the UE based on the second information. Because a time taken by the UE to process the second information in a protocol stack is shortened, a service delay can be shortened, and timeliness of a service can be improved.

Figure 16A:
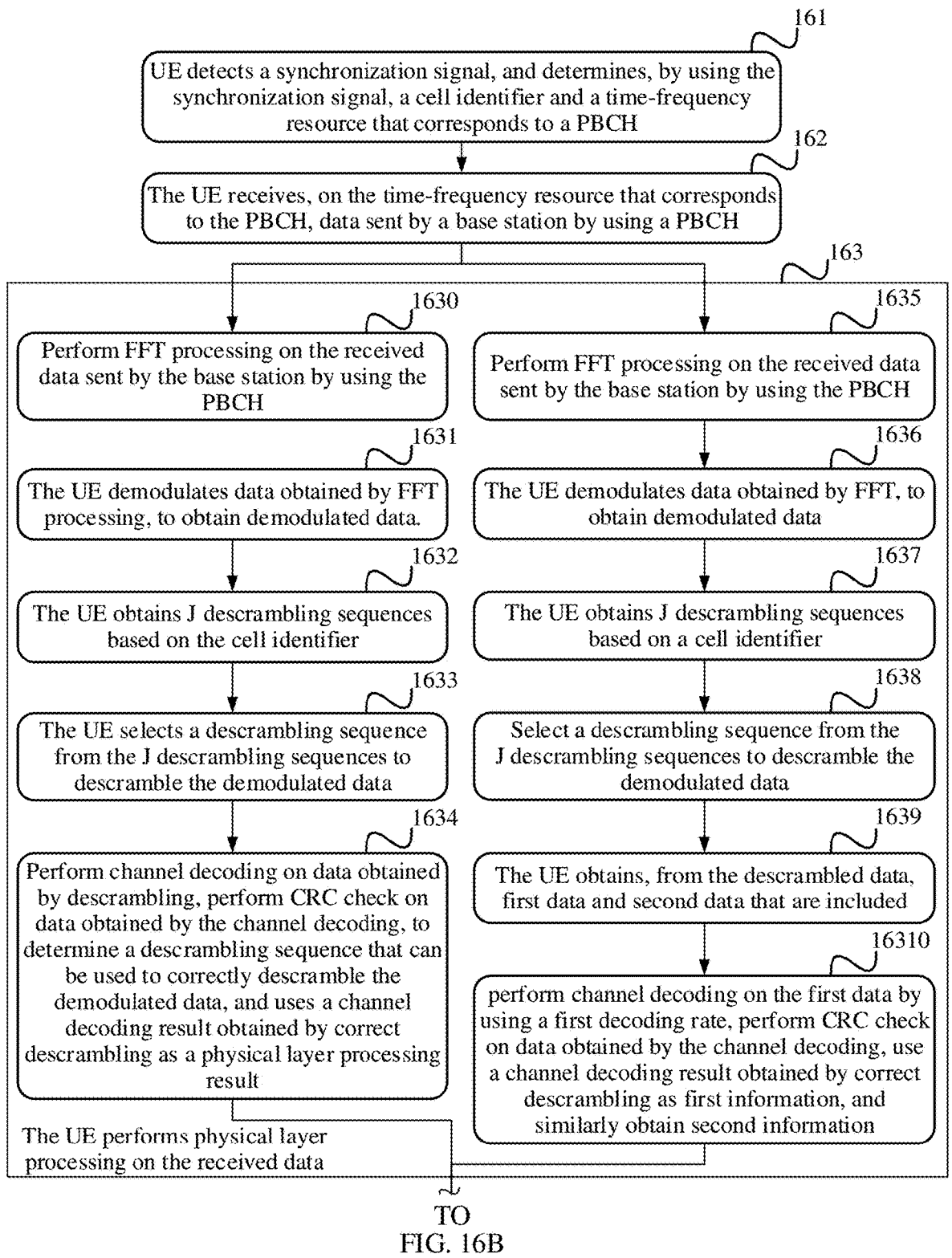
FIG. 16A and FIG. 16B are a flowchart of another broadcast signal receiving method according to an embodiment of this application.
Figure 16B:
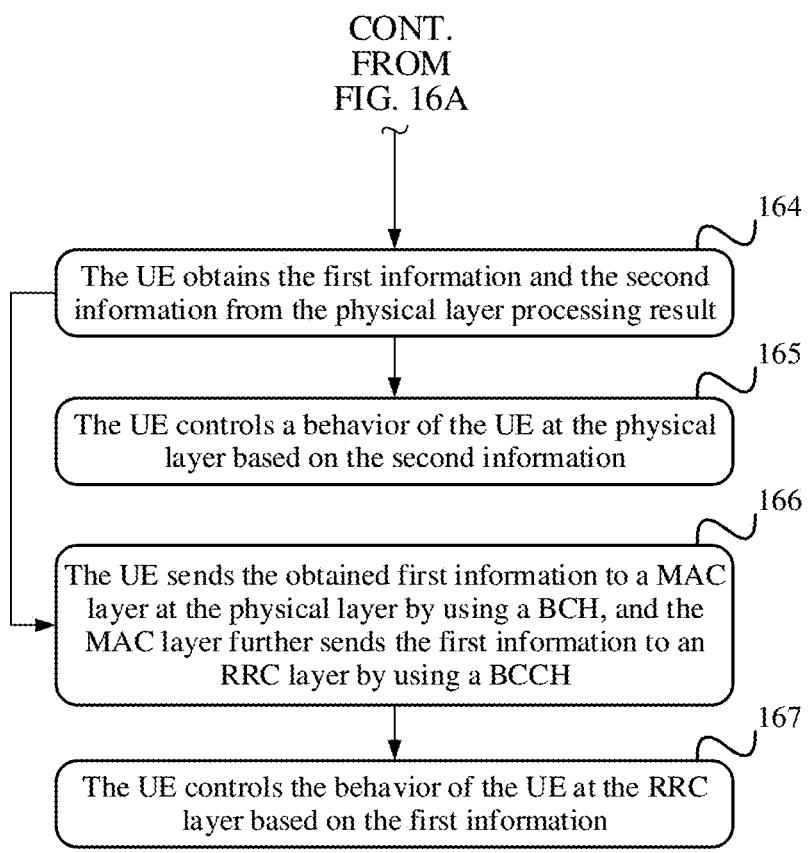

In FIG. 16A and FIG. 16B, that the second protocol layer in FIG. 15 is a physical layer is used as an example to further describe a broadcast signal receiving method provided in the embodiments of this application.

Step 161: UE detects a synchronization signal, and determines, by using the synchronization signal, a cell identifier and a time-frequency resource that corresponds to a PBCH.

Step 162: The UE receives, on the time-frequency resource that corresponds to the PBCH, data sent by a base station by using the PBCH.

Step 163: The UE performs physical layer processing on the received data.

Physical layer processing performed by the UE on received N groups of data corresponds to physical layer processing used when the base station sends a broadcast signal. Optionally, if physical layer processing shown in FIG. 6A and FIG. 6B is used when the base station sends the broadcast signal, physical layer processing performed by the UE on the received N groups of data includes steps 1630 to 1634. If physical layer processing shown in FIG. 8A and FIG. 8B is used when the base station sends the broadcast signal, physical layer processing performed by the UE on the received N groups of data includes steps 1635 to 16310.

Step 1630: The UE performs FFT processing on the received data sent by the base station by using the PBCH.

Step 1631: The UE demodulates data obtained by FFT processing, to obtain demodulated data.

Step 1632: The UE obtains J descrambling sequences based on the cell identifier obtained in step 161.

Step 1633: The UE selects a descrambling sequence from the J descrambling sequences to descramble the demodulated data.

Step 1634: The UE performs channel decoding on data obtained by descrambling, performs CRC check on data obtained by the channel decoding, to determine a descrambling sequence that can be used to correctly descramble the demodulated data, and uses a channel decoding result obtained by correct descrambling as a physical layer processing result, so that the UE obtains the first information and the second information from the physical layer processing result.

Step 1635: The UE performs FFT processing on the received data sent by the base station by using the PBCH.

Step 1636: The UE demodulates data obtained by FFT processing, to obtain demodulated data.

Step 1637: The UE obtains J descrambling sequences based on the cell identifier obtained in step 161.

Step 1638: The UE selects a descrambling sequence from the J descrambling sequences to descramble the demodulated data.

Step 1639: The UE obtains, from the descrambled data, first data and second data that are included thereof. A manner of obtaining the first data and the second data from a descrambling result corresponds to the manner of combining the first coding result and the second coding result in step 8033 in FIG. 8A and FIG. 8B.

Step 16310: The UE performs channel decoding on the first data by using a first decoding rate, performs CRC check on data obtained by the channel decoding, to determine a descrambling sequence that can be used to correctly descramble the demodulated data, and uses a channel decoding result obtained by correct descrambling as the first information.

The UE performs channel decoding on the second data by using a second decoding rate, and performs CRC check on the data obtained by the channel decoding, to determine the descrambling sequence that can be used to correctly descramble the demodulated data. The channel decoding result obtained by correct descrambling is used as the second information. The UE uses the first information and the second information as the physical layer processing result.

Optionally, to improve decoding accuracy, the UE may perform the foregoing processing on data received on PBCHs in a plurality of SSBs, to obtain a plurality of pieces of first data, combine the plurality of pieces of first data, and then perform channel decoding on combined first data by using the first decoding rate.

Optionally, corresponding to the coding rates, the first decoding rate is greater than the second decoding rate. Because a coding rate used when the base station encodes the second information is relatively low, decoding accuracy of corresponding decoding performed by the UE is relatively high. Therefore, when receiving any group of data sent by the base station by using the PBCH, the UE may immediately perform demodulation and descrambling processing on the group of data, and directly decode the second data included in a descrambling result of the group of data, to obtain the second information.

Step 164: The UE obtains the first information and the second information from the physical layer processing result.

Step 165: The UE controls a behavior of the UE at the physical layer based on the second information.

Step 166: The UE sends the obtained first information to a MAC layer at the physical layer by using a BCH, and the MAC layer further sends the first information to an RRC layer by using a BCCH.

Step 167: The UE controls the behavior of the UE at the RRC layer based on the first information.

Corresponding to that the base station uses physical layer processing process shown in FIG. 10, FIG. 11, or FIG. 12, the UE may use a corresponding physical layer processing process for the data received from the PBCH in the SSB. A principle is similar to that in FIG. 16A and FIG. 16B, and details are not described herein again.

Figure 17:
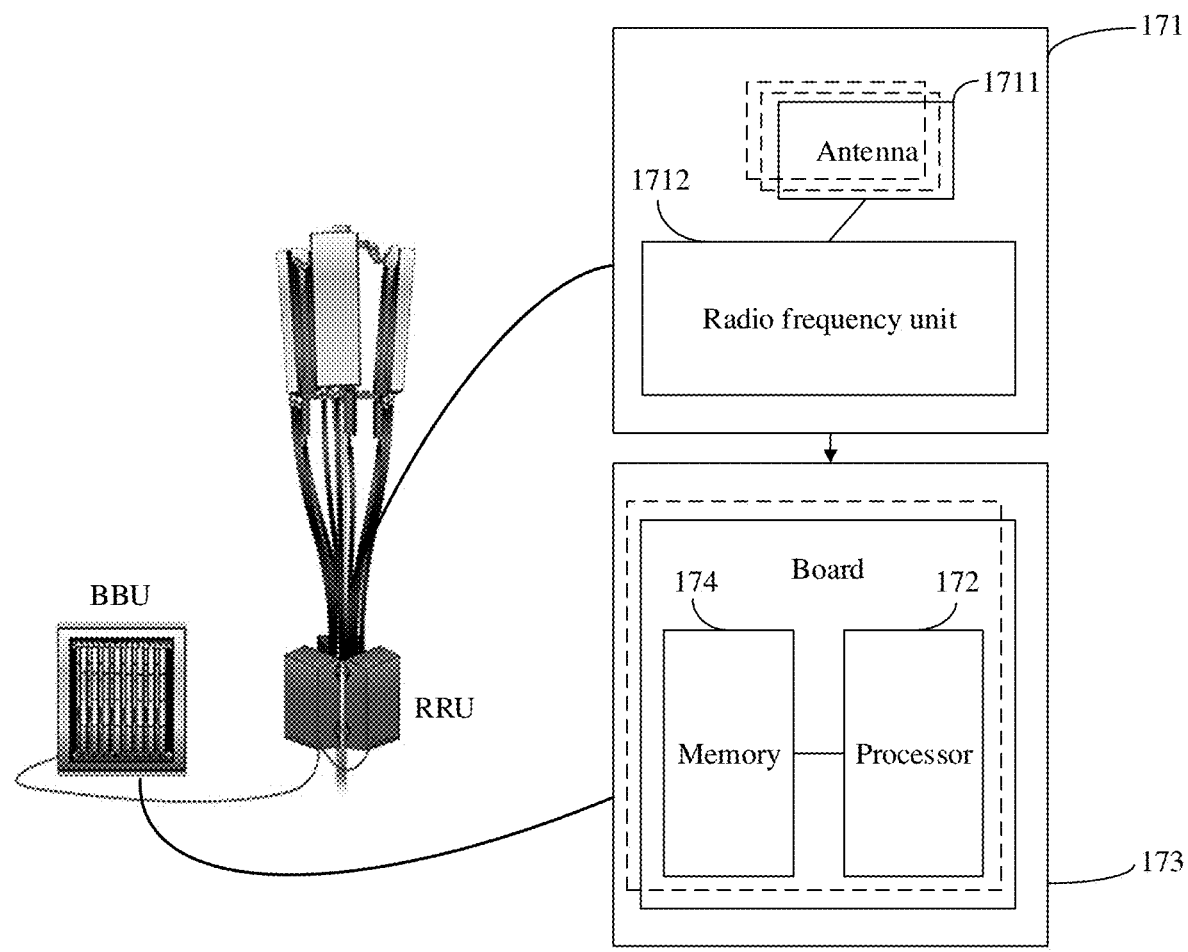
FIG. 17 is a schematic structural diagram of a network device according to an embodiment of this application.

An embodiment of this application further provides a network device. For example, the network device is a base station. The following describes a structure and a function of the network device with reference to FIG. 17 by using a base station as an example. FIG. 17 is a schematic structural diagram of a network device. The network device serves as the network device in FIG. 1, and the base station in FIG. 4 to FIG. 14, to implement functions of the network device in FIG. 1 and the base station in the embodiments shown in FIG. 4 to FIG. 14. As shown in FIG. 17, the network device includes a transceiver 171 and a processor 172.

Optionally, the transceiver 171 may be referred to as a remote radio unit (RRU), a transceiver unit, a transceiver, a transceiver circuit, or the like. The transceiver 171 may include at least one antenna 1711 and a radio frequency unit 1712. The transceiver 171 may be configured to receive and send a radio frequency signal, and perform conversion between a radio frequency signal and a baseband signal.

Optionally, the network device includes one or more baseband units (BBU) 173. The baseband unit includes the processor 172. The baseband unit 173 is mainly configured to perform baseband processing, such as channel coding, multiplexing, modulation, spectrum spreading, and control the base station. The transceiver 171 and the baseband unit 173 may be physically disposed together or may be physically separated from each other, that is, a distributed base station.

In an example, the baseband unit 173 may include one or more boards, and a plurality of boards may jointly support a radio access network of a single access standard, or may separately support radio access networks of different access standards. The baseband unit 173 includes the processor 172. The processor 172 may be configured to control the network device to perform corresponding operations in the foregoing method embodiments. Optionally, the baseband unit 173 may further include a memory 174, configured to store a necessary instruction and necessary data.

The processor 172 is configured to generate first information at a first protocol layer, where a protocol stack of the network device includes the first protocol layer and a second protocol layer, and the second protocol layer is a protocol layer below the first protocol layer, and generate second information at the second protocol layer, where the second information is used to determine a time-frequency resource corresponding to one or more synchronization signal blocks SSBs.

The processor 172 is further configured to process the first information and the second information at the second protocol layer.

The transceiver 171 is configured to send, to UE by using a PBCH in the SSB, data obtained after second protocol layer processing.

Optionally, the first information includes system information. The system information includes one or more of the following: a system bandwidth parameter value, an SFN, or configuration information of RMSI.

Optionally, the second protocol layer is a MAC layer or a physical layer. The first protocol layer is an RRC layer.

If the second protocol layer is a MAC layer, the sending, to UE by using a PBCH in the SSB, data obtained after second protocol layer processing includes performing, by the processor 172, physical layer processing on the data obtained by second protocol layer processing, and sending, by the transceiver 171 to the UE by using a PBCH symbol in the time-frequency resource corresponding to the SSB, data obtained after physical layer processing.

Optionally, for a specific manner in which the processor 172 performs MAC layer processing on the first information and the second information at the MAC layer, refer to related descriptions in FIG. 13 and FIG. 14, and repetitions are not described herein again.

Optionally, for a specific manner in which the processor 172 performs physical layer processing on the first information and the second information at the physical layer, refer to descriptions in the foregoing method embodiments, especially to related descriptions in FIG. 6A and FIG. 6B to FIG. 12, and repetitions are not described herein again.

Figure 18:
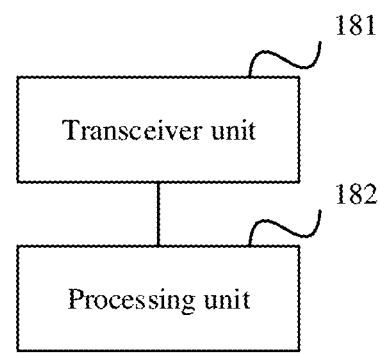
FIG. 18 is a schematic structural diagram of another network device according to an embodiment of this application.

An embodiment of this application further provides a network device. For example, the network device is a base station. The following describes a structure and a function of the network device with reference to FIG. 18 by using a base station as an example. FIG. 18 is a schematic structural diagram of a network device. The network device serves as the network device in FIG. 1, and the base station in FIG. 4 to FIG. 14, and has functions of the network device in FIG. 1 and the base station in the embodiments shown in FIG. 4 to FIG. 14. As shown in FIG. 18, the network device includes a transceiver unit 181 and a processing unit 182. The transceiver unit 181 and the processing unit 182 may be implemented by software or hardware. When being implemented by hardware, the transceiver unit 181 may be the transceiver 181 in FIG. 17, and the processing unit 182 may be the processor 172 in FIG. 17.

An embodiment of this application provides a network device, for example, a base station. A protocol stack of the network device includes a first protocol layer and a second protocol layer, and the second protocol layer is a protocol layer below the first protocol layer. For the network device, first information in information finally transmitted on a PBCH is generated at the first protocol layer of the network device, second information is generated at the second protocol layer of the network device, and the second information is used to determine a time-frequency resource corresponding to one or more synchronization signal blocks SSBs. The second information may be sent to UE on the PBCH only by being processed at a protocol layer below the second protocol layer. Compared with a solution in which all information transmitted on the PBCH is processed in an entire protocol stack below the first protocol layer, this solution shortens a time consumed to process, in the protocol stack, the information transmitted on the PBCH, and helps shorten a service delay.

Figure 19:
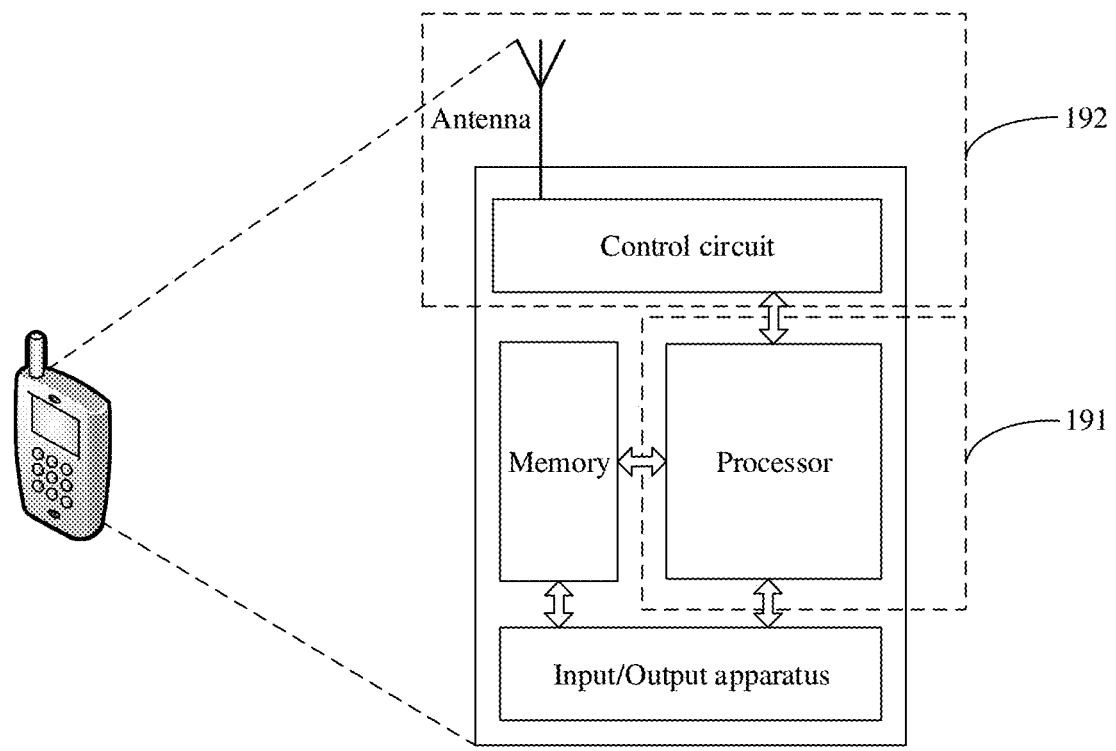
FIG. 19 is a schematic structural diagram of a terminal device according to an embodiment of this application.

An embodiment of this application further provides a terminal device. It should be understood that the terminal device may be the UE in the foregoing method embodiments, and may have any function of the UE in the method embodiments. FIG. 19 is a schematic structural diagram of a terminal device. The terminal device serves as the UE in FIG. 1, and the UE in FIG. 15 and FIG. 16A and FIG. 16B, to implement functions of the UE in an embodiment shown in FIG. 1, FIG. 15, or FIG. 16A and FIG. 16B. As shown in FIG. 19, the terminal device includes a processor 191 and a transceiver 192.

Optionally, the transceiver 192 may include a control circuit and an antenna. The control circuit may be configured to perform conversion between a baseband signal and a radio frequency signal, and process a radio frequency signal, and the antenna may be configured to transmit and receive radio frequency signals.

Optionally, the apparatus may further include other main components of the terminal device, for example, a memory and input/output apparatus.

The processor 191 may be configured to process a communication protocol and communication data, control the entire terminal device, execute a software program, and process data of the software program, for example, configured to support the terminal device in performing a corresponding operation in the foregoing method embodiments. A memory 193 is mainly configured to store a software program and data. After the terminal device is powered on, the processor 191 may read a software program in the memory, interpret and execute an instruction of the software program, and process data of the software program.

In an embodiment, the transceiver 192 is configured to receive data sent by a base station by using a PBCH. The terminal device includes a first protocol layer and a second protocol layer, and the first protocol layer is a protocol layer above the second protocol layer.

The processor 191 is configured to perform physical layer processing on the received data, obtain, at the second protocol layer, first information and second information from a physical layer processing result, where the second information is used to determine a time-frequency resource corresponding to one or more synchronization signal blocks SSBs, control, at the second protocol layer, a behavior of the terminal device based on the second information, and control, at the first protocol layer, the behavior of the terminal device based on the first information.

Optionally, the first information is system information. For descriptions of the system information, refer to the descriptions in the foregoing embodiments. Repetitions are not described herein again.

Optionally, the first protocol layer is an RRC layer, and the second protocol layer is a physical layer or a MAC layer.

Optionally, for a process in which the transceiver 192 receives the data that is sent by the base station by using the PBCH and a process in which the processor 191 performs physical layer processing on the received data, refer to the descriptions in the foregoing method embodiments, especially to related descriptions in FIG. 1 and FIG. 15 to FIG. 16A and FIG. 16B. Details are not described herein again.

Figure 20:
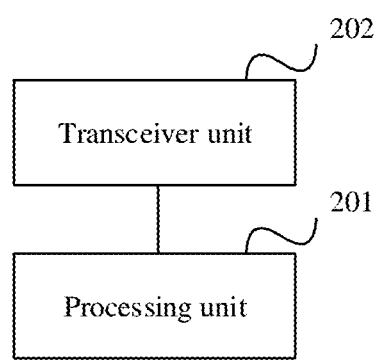
FIG. 20 is a schematic structural diagram of another terminal device according to an embodiment of this application.

An embodiment of this application further provides a terminal device. It should be understood that the UE may be the UE in the foregoing method embodiments, and may have any function of the UE in the method embodiments. FIG. 20 is a schematic structural diagram of UE. The UE serves as the UE in FIG. 1, FIG. 15, and FIG. 16A and FIG. 16B, and implements functions of the UE in an embodiment of FIG. 1, FIG. 15, and FIG. 16A and FIG. 16B. As shown in FIG. 20, the base station includes a processing unit 201 and a transceiver unit 202. The processing unit 201 and the transceiver unit 202 may be implemented by software or hardware. When being implemented by hardware, the processing unit 201 may be the processor 191 in FIG. 19, and the transceiver unit 202 may be the transceiver 192 in FIG. 19.

An embodiment of this application provides a terminal device. A protocol stack of the terminal device includes a first protocol layer and a second protocol layer, and the first protocol layer is a protocol layer above the second protocol layer. The terminal device receives data sent by a base station by using a PBCH. After UE performs physical layer processing on the received data, the terminal device obtains, at the second protocol layer, first information and second information from data obtained by physical layer processing. The UE controls a behavior of the terminal device at the second protocol layer based on the second information, and controls the behavior of the terminal device at the first protocol layer based on the first information. After processing, at the physical layer, the data sent on the PBCH, the terminal device does not need to report, to the first protocol layer for processing, all data obtained after physical layer processing, and instead may directly read the second information thereof at the second protocol layer, and control the behavior of the terminal device based on the second information. Because a time taken by the terminal device to process the second information in a protocol stack is shortened, a service delay can be shortened, and timeliness of a service can be improved.

An embodiment of the present invention further provides a communications system, including the network device and the terminal device in the foregoing embodiments. For functions of the network device and the terminal device and a detailed process of mutual information exchange, refer to descriptions in the foregoing embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A broadcast signal sending method, comprising:
    generating, by a network device, first information at a radio resource control (RRC) layer;
    generating, by the network device, second information at a physical layer, wherein the second information is information related to a synchronization signal block (SSB);
    processing, by the network device, the first information and the second information at the physical layer, wherein the processing comprises performing channel coding, scrambling and modulation on a combination result of the first information and the second information; and
    sending, by the network device to a terminal device by using a physical broadcast channel (PBCH) in the SSB, a processing result of the processing the first information and the second information.

2. The method according to claim 1, wherein the second information is associated with a time-frequency resource of the SSB, wherein the second information comprises one or more bits of a sequence number of the SSB.

3. The method according to claim 2, wherein the combination result of the first information and the second information comprises bits of the first information, bits of the second information and bits of a cyclic redundancy check (CRC) code.

4. The method according to claim 1, wherein a scrambling code used for scrambling processing in the physical layer processing corresponds to one or more bits of a sequence number of the SSB.

5. A broadcast signal receiving method, comprising:
    receiving, by a terminal device, data sent by a network device by using a physical broadcast channel (PBCH), wherein a protocol stack of the terminal device comprises radio resource control (RRC) layer and a physical layer;
    performing, by the terminal device, physical layer processing on the received data, wherein the physical layer processing comprises demodulation, descrambling and channel decoding of the received data; and obtaining, by the terminal device at the physical layer, second information and data related to first information from a physical layer processing result based on the received data, wherein the second information is information related to a synchronization signal block (SSB), and wherein the data related to the first information is processed at the RRC layer to obtain the first information.

6. The method according to claim 5, wherein the second information is associated with a time-frequency resource of the SSB, wherein the second information comprises one or more bits of a sequence number of the SSB.

7. The method according to claim 6, wherein the second information comprises a sequence number of the SSB.

8. The method according to claim 5, wherein a scrambling code used for descrambling in the physical layer processing corresponds to one or more bits of a sequence number of the SSB.

9. A network device, comprising:
a transceiver;
a processor; and
a non-transitory computer-readable storage medium storing a program to be executed by the processor, the program including instructions to:
generate first information at a radio resource control (RRC) layer,
generate second information at a physical layer, wherein the second information is information related to a synchronization signal block (SSB);
process the first information and the second information at the physical layer wherein the process comprises perform channel coding, scrambling and modulation on a combination result of the first information and the second information; and
cause the transceiver to send, to a terminal device by using a physical broadcast channel (PBCH) in a time-frequency resource corresponding to the SSB, a processing result of the processing the first information and the second information.

10. The network device according to claim 9, wherein the second information is associated with a time-frequency resource of the SSB, wherein the second information comprises one or more bits of a sequence number of the SSB.

11. The network device according to claim 10, wherein the combination result of the first information and the second information comprises bits of the first information, bits of the second information and bits of a cyclic redundancy check (CRC) code.

12. The network device according to claim 9, wherein a scrambling code used for scrambling processing in the physical layer processing corresponds to one or more bits of a sequence number of the SSB.

13. A terminal device, comprising:
a transceiver;
a processor; and
a non-transitory computer-readable storage medium storing a program to be executed by the processor, the program including instructions to:
receive, through the transceiver, data sent by a network device by using a physical broadcast channel (PBCH), wherein a protocol stack of the terminal device comprises a radio resource control (RRC) layer and a physical layer,
perform physical layer processing on the received data, wherein the physical layer processing comprises demodulation, descrambling and channel decoding; and obtain, at the physical layer, second information and data related to first information and from a physical layer processing result based on the received data, wherein the second information is information related to a synchronization signal block (SSB), and wherein the data related to the first information is processed at the RRC layer to obtain the first information.

14. The terminal device according to claim 13, wherein the second information is associated with a time-frequency resource of the SSB, wherein the second information comprises one or more bits of a sequence number of the SSB.

15. The terminal device according to claim 14, wherein the second information comprises a sequence number of the SSB.

16. The terminal device according to claim 13, wherein a scrambling code used for descrambling in the physical layer processing corresponds to one or more bits of a sequence number of the SSB.

17. A non-transitory computer storage medium, storing computer instructions that, when executed by a network device, cause the network device to perform:
generating first information at a radio resource control (RRC) layer;
generating second information at a physical layer, wherein the second information is information related to a synchronization signal block (SSB);
processing the first information and the second information at the physical layer, wherein the processing comprises performing channel coding, scrambling and modulation on a combination result of the first information and the second information; and
sending, to a terminal device by using a physical broadcast channel (PBCH) in the SSB, a processing result of the processing the first information and the second information.

18. A non-transitory computer storage medium, storing computer instructions that, when executed by a network device, cause the network device to perform:
receiving a physical broadcast channel (PBCH) carrying data from a network device;
performing physical layer processing on the received data, wherein the physical layer processing comprises demodulation, descrambling and channel decoding; and
obtaining second information and data related to first information from a physical layer processing result based on the received data, wherein the second information is information related to a synchronization signal block (SSB), and wherein the data related to the first information is processed at a protocol radio resource control (RRC) layer to obtain the first information.

19. The non-transitory computer storage medium according to claim 18, wherein the second information is associated with a time-frequency resource of the SSB, wherein the second information comprises one or more bits of a sequence number of the SSB.

20. The non-transitory computer storage medium according to claim 18, wherein a scrambling code used for descrambling in the physical layer processing corresponds to one or more bits of a sequence number of the SSB.

* * * * *